US010624059B2

(12) United States Patent
Wei et al.

(10) Patent No.: US 10,624,059 B2
(45) Date of Patent: Apr. 14, 2020

(54) TELECOMMUNICATIONS APPARATUS AND METHODS

(71) Applicant: SONY CORPORATION, Tokyo (JP)

(72) Inventors: Yuxin Wei, Basingstoke (GB); Hideji Wakabayashi, Basingstoke (GB); Shinichiro Tsuda, Basingstoke (GB)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/060,193

(22) PCT Filed: Dec. 12, 2016

(86) PCT No.: PCT/EP2016/080695
§ 371 (c)(1),
(2) Date: Jun. 7, 2018

(87) PCT Pub. No.: WO2017/102666
PCT Pub. Date: Jun. 22, 2017

(65) Prior Publication Data
US 2018/0376452 A1 Dec. 27, 2018

(30) Foreign Application Priority Data

Dec. 17, 2015 (EP) .................................. 15200878

(51) Int. Cl.
*H04W 68/02* (2009.01)
*H04W 76/27* (2018.01)
(Continued)

(52) U.S. Cl.
CPC ........... *H04W 68/02* (2013.01); *H04W 76/14* (2018.02); *H04W 76/27* (2018.02); *H04W 76/28* (2018.02); *H04W 88/04* (2013.01)

(58) Field of Classification Search
CPC ...... H04W 76/28; H04W 76/14; H04W 88/04
See application file for complete search history.

(56) References Cited

U.S. PATENT DOCUMENTS 8,837,325 B2 * 9/2014 Zhang ................... H04W 68/02
370/254
2012/0015655 A1 1/2012 Lee
(Continued)

FOREIGN PATENT DOCUMENTS

EP          2 426 960 A1     3/2012
WO   WO 2010/112824 A1   10/2010
WO   WO 2015/021284 A1    2/2015

OTHER PUBLICATIONS

Chen, Y. et al., "Analysis and Improvement of mobility procedures for mobile relays in LTE Networks", 2015 IEEE 26$^{th}$ International Symposium on Personal, Indoor and Mobile Radio Communications—(PIMRC): Mobile and Wireless Networks, XP32822251A, 2015, pp. 1769-1774.

(Continued)

*Primary Examiner* — Yemane Mesfin
*Assistant Examiner* — Henry Baron
(74) *Attorney, Agent, or Firm* — Xsensus LLP

(57) ABSTRACT

A method for use in a mobile telecommunications network that includes a core network, a base station providing wireless connectivity within a base station cell, a mobile node in the base station cell providing wireless connectivity within a local cell and configured to communicate wirelessly with the base station, and a terminal configured to communicate wirelessly with the base station and with the mobile node; includes defining a virtual cell tracking area that encompasses the local cell and has a unique virtual cell tracking area identifier; notifying the core network of an association of the terminal with the mobile node and the base station; sending a paging message for the terminal from the core network to the base station using the association, the paging message including the virtual cell tracking area identifier; forwarding the paging message from the base (Continued)

station to the terminal using the virtual cell tracking area identifier.

14 Claims, 7 Drawing Sheets

(51) Int. Cl.
*H04W 88/04* (2009.01)
*H04W 76/28* (2018.01)
*H04W 76/14* (2018.01)

(56) References Cited

U.S. PATENT DOCUMENTS

| | | |
|---|---|---|
| 2012/0039246 A1 | 2/2012 | Zhang et al. |
| 2013/0014356 A1 | 6/2013 | Singh et al. |
| 2015/0043398 A1 | 2/2015 | Fwu et al. |
| 2015/0043403 A1 | 2/2015 | Martinez Tarradell et al. |
| 2015/0043404 A1 | 2/2015 | Sergeyev et al. |
| 2015/0043439 A1 | 2/2015 | Sajadieh et al. |
| 2015/0043445 A1 | 2/2015 | Xiong et al. |
| 2015/0043447 A1 | 2/2015 | Stojanovski et al. |
| 2015/0043449 A1 | 2/2015 | Bangolae et al. |
| 2015/0373598 A1* | 12/2015 | Tsuboi ............... H04W 16/32 370/331 |
| 2016/0156440 A1 | 6/2016 | Sergeyev et al. |
| 2016/0173262 A1 | 6/2016 | Davydov et al. |
| 2016/0191135 A1 | 6/2016 | Chen et al. |
| 2016/0373994 A1 | 12/2016 | Yiu et al. |

OTHER PUBLICATIONS

3GPP2 A.S0024-B v1.0, "Interoperability Specification( IOS) for Femtocell Access Points", 3$^{rd}$ Generation Partnership Project 2, Dec. 2012, 160 pages.

Holma, H. et al., "LTE for UMTS OFDMA and SC-FDMA Based Radio Access", John Wiley and Sons, 2009, 8 pages.

3GPP TS 36.331, V12.7.0, 3$^{rd}$ Generation Partnership Project; Technical Specification Group Radio Access Network; Evolved Universal Terrestrial Radio Access (E-UTRA); Radio Resource Control (RRC); Protocol specification, Sep. 2015, 453 pages.

International Search Report dated Mar. 29, 2017 in PCT/EP2016/080695 filed Dec. 12, 2016.

Communication Pursuant to Article 94(3) EPC dated Apr. 5, 2019 in European Application No. 16819477.7-1231.

* cited by examiner

TELECOMMUNICATIONS APPARATUS AND METHODS

BACKGROUND

Field

The present disclosure relates to telecommunications apparatus and methods, in particular with regard to paging procedures.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, users can enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. The increasing use of wireless telecommunications requires that the networks can support a corresponding increase in traffic. One particular area where capacity issues may arise is for paging procedures, by which a network can communicate with a device in a non-active or idle state. While being a general concern, an example issue regarding the paging capacity of networks is the ability to provide widespread support for so-called machine type communication (MTC) devices. These are typified by semi-autonomous or autonomous wireless communication devices that communicate small amounts of data on a relatively infrequent basis. Examples include so-called smart meters, located in a customer's property and configured to periodically transmit data indicating the customer's consumption of a utility. It is envisaged that MTC devices will be introduced into networks in much larger numbers than conventional terminal devices such as mobile telephones, perhaps by an order of magnitude or more. In addition to the expected large number of MTC devices, the nature of machine-to-machine/MTC-type traffic means the ratio of idle devices to active devices will likely be relatively high among MTC devices. Consequently, it may be that the majority of MTC devices in a network will be in an idle state with the network reliant on paging to initiate communications with the device. Paging capacity may therefore become a bottleneck in wireless telecommunications systems.

Hence, apparatus and methods configured to address the issue of paging congestion (arising from both MTC devices and other devices) in wireless telecommunications systems are of interest.

SUMMARY

The present disclosure can help address or mitigate at least some of the issues discussed above. Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
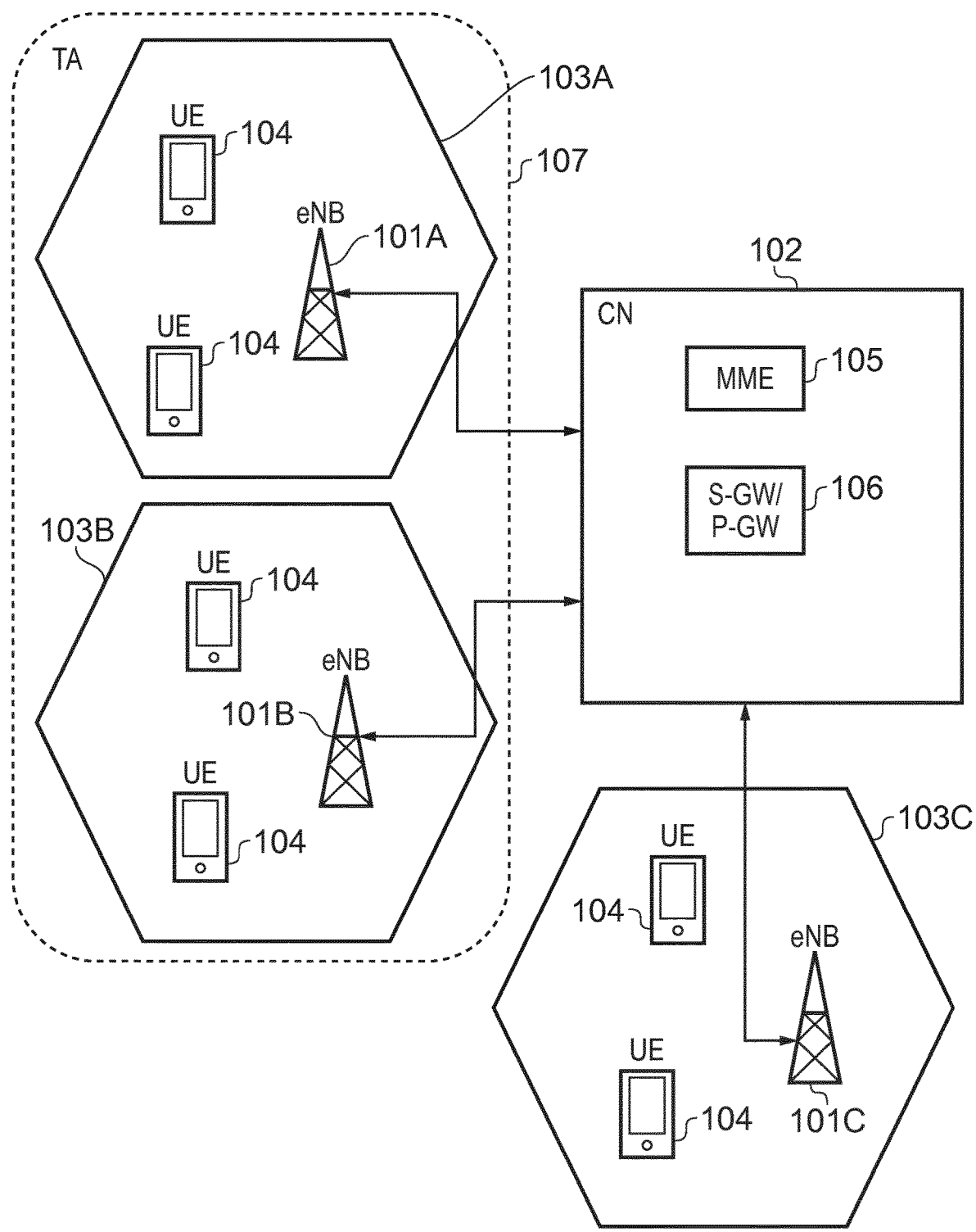
FIG. 1 shows a schematic representation of an example mobile telecommunications network or system.

FIG. 1 provides a schematic diagram illustrating some basic functionality of a wireless telecommunications network/system operating in accordance with LTE principles. The various elements of FIG. 1 and their respective modes of operation and mutual interactions are well-known and defined in the relevant standards administered by the 3GPP® body and also described in many books on the subject, for example, Holma, H. and Toskala, A. [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network includes a plurality of base stations (eNB) 101A, B, C connected to a core network (CN) 102. Each base station provides wireless connectivity within a coverage area 103A, B, C (i.e. a communication cell or, simply, a cell) within which data can be communicated to and from various terminal devices (UE) 104. In accordance with conventional terminology, a terminal device may also be referred to as a mobile station, user equipment (UE), user terminal, mobile radio, and so forth. Similarly, a base station may also be referred to as a transceiver station/nodeB/e-NodeB, eNB, and so forth. Furthermore, it will be appreciated the terms base station and cell may also sometimes be used interchangeably, for example, the process of a terminal device connecting to the radio access part of a wireless telecommunications system might be referred to as accessing a cell or accessing a base station. Nonetheless, it will be appreciated in some cases that the physical apparatus comprising a base station may comprise equipment for supporting more than one communication cell and in such cases it can still be appropriate to draw a distinction between base stations and cells.

In terms of basic operation, data are transmitted between base stations 101A, B, C and terminal devices 104 using various radio downlink and uplink channels. Data is transmitted from the base stations 101A, B, C to those terminal devices 104 within their respective coverage areas 103A, B, C via a radio downlink DL. Data is transmitted from the terminal devices 104 to the corresponding base station 101A, B, C via a radio uplink UL. Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA). The core network 102 routes data to and from terminal devices 104 via respective base stations 101A, B, C and provides functions including authentication, mobility management, charging and so on. To this end, the core network (CN) 102 comprises a mobility management entity (MME) 105, and a serving gateway (S-GW) entity and packet data network gateway (P-GW) entity. For simplicity the serving gateway entity and packet data network gateway are schematically represented in FIG. 1 as a single combined (S-GW/P-GW) gateway entity 106.

It is known for a group of base stations (with associated cells) to be logically grouped together into a so-called tracking area (TA). In FIG. 1 the communication cells 103A and 103B associated with base stations 101A and 101B are schematically represented as belonging to a tracking area 107. For this particular example it is assumed the communication cell 103C associated with base station 101C belongs to a different tracking area, although this other tracking area is not represented in the figure. The sizes of tracking areas are typically not specified in wireless telecommunications system specifications. However, a typical tracking area in an LTE-based network might be expected to include perhaps twenty base stations/cells, but could be more/fewer according to the implementation at hand. Tracking areas play a role in paging as discussed further below.

As is well understood, in various wireless telecommunications networks, such as the LTE-based network represented in FIG. 1, there are two Radio Resource Control (RRC) modes for terminal devices that govern radio communications for a terminal device. These are (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are attached to the network, but not currently in active communication. Generally, a terminal device camping on a cell will be in RRC_IDLE, and when it wants to send data (user data) to the base station, it will transition into the RRC_CONNECTED state. Once data transmission is complete, the terminal can revert to RRC_IDLE. The base station maintains RRC connection context information for all terminals in its cell that are communicating with/through it. Functionalities of the two RRC states are given in the current 3GPP Technical Specification document 36.331 [2].

The RRC_IDLE state can be thought of as a limited or low radio connection, and the RRC_CONNECTED state can be thought of as a full or high radio connection. The present disclosure is equally applicable to mobile telecommunications systems using these states within the 3GPP architecture and to other comparable limited states and full states defined within other telecommunications architectures and protocols. Accordingly, radio resource control states may be defined for the terminal to have a full connection or a limited connection with a local cell or relay node and/or a full connection or a limited connection with the base station. As used herein, a "full" connection or a terminal being "fully" connected with one of a mobile node or a base station refers to a radio resource control (e.g. RRC in 3GPP) state in which the terminal can (among other functions) exchange user data and signalling with the mobile node or base station. A "limited" connection refers to a radio resource control state in which the terminal remains connected to the mobile node or base station but cannot exchange user data with the mobile node or base station. For example, in a limited mode, the terminal may be configured to do one or more of: monitoring and receiving paging information, carrying out measurements, handling mobility (e.g. to another virtual cell or base station cell), and the like. Furthermore, in a limited mode the terminal may be able to receive data in a broadcast manner such as by MBMS (Multimedia Broadcast Multicast Services) or eMBMS (evolved MBMS).

The RRC states apply to connectivity between the terminal device and the base station. A terminal device also has a connectivity state with the core network. In LTE, this is designated as an ECM (EPS Connection Management) state, which may be ECM_IDLE or ECM_CONNECTED.

For a terminal device in RRC idle mode the core network (CN) 102 is aware the terminal device is present within the network, but the radio access network (RAN) part (comprising the base stations 101A, B, C) is not. More specifically, for a terminal device in RRC idle mode, core network nodes such as the MME 105 of FIG. 1 recognize the idle mode terminal device at a tracking area level. That is to say, the core network 102 does not attempt to keep track of terminal device locations at the level of individual communication cells/base stations, but seeks only to keep track of which tracking area the terminal device is currently located within. The core network will generally assume a terminal device is located within the tracking area(s) associated with the base station most recently accessed by the terminal device, unless the terminal device has since provided a specific tracking area update (TAU) to the network. (As is conventional, an idle mode terminal device is typically required to send a TAU when it detects that it has entered a different tracking area, to allow the core network to keep track of its location.) The TAU information enables the core network to contact an idle terminal device, using a paging procedure, such as is described further below. Because the core network tracks the terminal devices at a tracking area level, where a tracking area includes several base stations, it is generally not possible for the network infrastructure to know which specific base station to use when seeking to initiate contact with a terminal device in idle mode. Paging procedures are configured accordingly.

Figure 2:
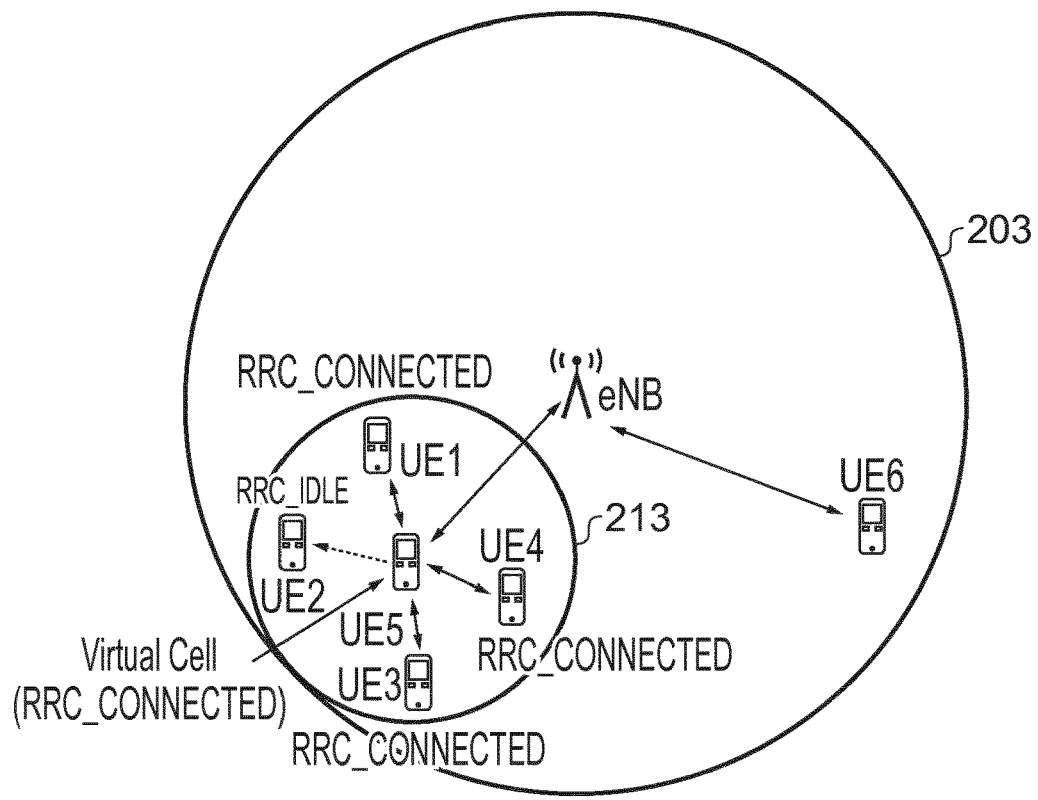
FIG. 2 shows a schematic representation of an example base station cell including a local cell.

It has been suggested that, within a network such as that of FIG. 1, a terminal device (UE) might operate to provide a local cell or virtual cell (VC), being a smaller cell within the base station's cell. This UE will operate as an intermediate node between other UEs in its vicinity and the network (for example a base station), as well as an intermediate node between UEs. The UE may communicate with neighbouring UEs and provide them with wireless connectivity to the base station (e.g. to reach the core network) and potentially to other neighbouring UEs as well. The UE provides the functions of a base station to the neighbouring UEs within its virtual cell coverage range. FIG. 2 schematically represents an example local cell arrangement. A base station eNB provides RRC connectivity in a cell 203. At the same time, a UE (UE5) operates as a "VC-UE" (for Virtual Cell UE) to provide RRC connectivity via a virtual cell or local cell 213. In the example of FIG. 2, the VC-UE provides mobile connectivity to four terminals UE1-UE4. UE1, UE3 and UE4 are in a RRC_CONNECTED state to the virtual cell, designated as VC_RRC_CONNECTED. Meanwhile, UE2 is in an RRC_IDLE state with respect to the virtual cell, designated as VC_RRC_IDLE, having transitioned from VC_RRC_CONNECTED or RRC_CONNECTED after completing a data transfer, for example. A sixth UE, UE6, is outside the coverage of the virtual cell 213, so relies on the eNB for connectivity. In this example, only one virtual cell 213 is provided in the cell 203 although in some examples more VC may be activated, or no VC may be activated. In the following, "VC", "virtual cell" or "local cell" may sometimes be used interchangeably with "VC-UE" (or "mobile node" or equivalents), particularly with reference to functionality and operability. The eNB can instruct a UE to begin operation as a VC-UE, for example, in response to demand such as a dense concentration of UEs near the VC-UE which are RRC_CONNECTED and hence requiring a high level of radio resource. This is commonly termed a "hot spot". Virtual cells may be set up in response to other situations and to service other environments, however. For example, they may be utilised in an office environment to improve efficiency of data traffic handling.

Within a local cell, the VC-UE provides a UE with a wireless connectivity to the base station, for example to reach the core network or a remote destination outside of the mobile network (e.g. a public server available from the internet). The UE is connected to the VC-UE and uses it as if it were a base station and the VC-UE sends the messages to the base station if need be (e.g. messages for a remote destination, the base station, the core network, etc.), thereby offering connectivity to the base station. Additionally or alternatively, the VC-UE can offer local connectivity to UEs in the local cell. For example, if two UEs in the local cell wish to communicate with each other, the VC-UE can identify that the destination for the messages is within its local cell and send the messages directly to the destination. This feature can assist in offloading some of the traffic and traffic management load of the base station. A VC-UE may communicate with UEs in its local cell using a wireless interface provided on one or more unlicensed, shared licensed and/or licensed bands, and may backhaul traffic to the network in any suitable way, although it is generally expected that this would be carried out using one or more licensed bands, for example to providing the backhauling over a wireless interface with a higher interference control.

A VC-UE is in effect a UE designated to provide a virtual cell function by working also as an intermediate node between UEs in its vicinity and the network, as well as an intermediate node between UEs. Note that the VC-UE does not operate in the same manner as a terminal-to-base station relay node as currently discussed in the 3GPP consortium, however. In effect such a relay is for relaying messages to the base station where the terminal is connected as an RRC (radio resource control) layer with the base station, but not with the relay node. In a virtual cell, the terminal is connected to the "relay" (VC-UE), which therefore operates more like an anchor than like a relay (in view of the present definition and use of 3GPP relays). With this type of service, it is envisaged that VC-UEs could manage certain aspects such as one or more of radio resource management, RRC connection control and the like, instead of reliance on the base station only for these aspects. A VC-UE may be expected not only to relay data but also to organize its own local network/cell from a radio/connection control perspective. The inclusion of such VC-UEs in a network may improve operational aspects, such as offloading some signalling overhead or resources allocation functions from the base station or by improving the efficiency of radio resource allocation, amongst other things. Hence, a virtual cell arrangement of this type, and as further discussed herein, in which an RRC connection can be established between a VC-UE and a UE, may provide various enhancements, and may be of benefit in situations such as the following, in particular in a 3GPP environment (although the same teachings could be transposed to a different environment): reduction of RRC signalling overhead between a UE and the eNB; centralisation of resource allocation within the VC; support for mobility control by the VC-UE (since both the VC-UE and the UEs are mobile devices); support for QoS differentiation, which is anticipated as an important aspect in future networks; and improvement of spectrum efficiency and service continuity by supporting measurement report transmission from the UE to the VC-UE.

When a UE in RRC_IDLE is notified to operate as a virtual cell by the eNB, RRC connection is established between the eNB and the UE in RRC_IDLE, and the UE transitions from its RRC_IDLE state to be RRC_CONNECTED with the eNB. An interface between the eNB and the virtual cell is activated for operation of the virtual cell; this may be the Un interface for relay node operation specified by 3GPP Release 10, or a new format of virtual cell interface yet to be specified, or any other suitable past or current interface. After setting up the virtual cell operation, the eNB performs procedures to cause the UEs in the virtual cell coverage area to handover from the eNB to the virtual cell. The network may control some prioritization of UE handover so as to avoid an excessive number of simultaneous handovers. For example the network may give higher prioritization to UEs which are performing higher QoS communications, large data communication, or the like. The procedures may include RRC Connection Setup, RRC Connection Reconfiguration and RRC Connection Re-establishment messages to configure the UEs to send Measurement Report messages which include measurements of the link quality between the UEs and the virtual cell as well as that between the UEs and the eNB. Furthermore, this configuration of measurement may be defined by Measurement Objects, Reporting Configurations, Measurement Identities, Quantity Configurations and Measurement Gaps, and the virtual cell may be included in a list of candidate cells to be measured as Measurement Objects. In this context the Un interface could support protocol stacks for S1 interface and X2 interface, so that the virtual cell may exchange any information related to load balancing and interference with the eNB. Thereby, the virtual cell can be enabled to perform resource management and ICIC (Inter Cell Interference Coordination) or eICIC (enhanced ICIC) so as to maximize efficiency of usage of radio resources under a hot spot condition (where a virtual cell has been set up on demand to handle a particularly dense concentration of UEs). After handover, the virtual cell 313 is established based on the UE, which becomes a virtual cell UE (VC-UE), and the UEs which have been handed over to the VC-UE are in a RRC-CONNECTED state with the VC-UE and able to continue participation in data traffic previously enabled by the RRC connection to the eNB. So, each UE is RRC_CONNECTED with the VC-UE (VC_RRC_CONNECTED), and the VC-UE is RRC_CONNECTED with the eNB. Note that in the interests of conciseness, RRC or RRC-like connections with a mobile node or VC-UE are referred to herein as "VC_RRC", and RRC or RRC-like connections with the base station are referred to herein as "RRC". This should not be understood as referring to the RRC defined in the 3GPP only, but rather is equally applicable to corresponding radio resource control connections providing at least the same or similar functionalities. In one example, the functionalities available in VC_RRC_IDLE are defined as: sleeping mode management for energy saving/DRX management; VC specific system information acquisition (if any); measurements configuration from the VC; and paging channel monitoring; and in VC_RRC_CONNECTED are defined as: data transfer between UE and VC; energy saving mode/DRX management; mobility control, handover to another VC or fallback to network; paging channel monitoring; VC specific system information acquisition (if any); monitoring of the VC's specific control channel and data channel to send/receive data; perform measurement if configured by the VC; and provide channel state information for the VC and feedback if necessary.

Local or virtual cells can therefore be expected to assist a base station, while being of a more transient nature than a base station (since they are provided by a terminal with mobility and which may run out of battery power). In common with a eNB, however, the virtual cell should manage its RRC connections to UEs, and it may be desired to utilise conventional RRC procedures as much as possible. Note that in the present context, the virtual cell may be established on a UE, or a relay node with mobility.

As mentioned above, a network can use a paging procedure to contact a UE in an idle state. Paging is an RRC functionality in LTE applicable to both RRC_IDLE and RRC_CONNECTED UEs, used to enable the following:
 initiate a UE-terminating PS data connection (such as incoming text message or call) or UE-terminating CS fallback connection for a UE in RRC_IDLE;
 inform UEs in RRC_IDLE and RRC_CONNECTED about system information changes, by triggering a UE to re-acquire system information; and
 distribute public safety notifications, including Earthquake and Tsunami Warning System (ETWS) notifications and Commercial Mobile Alert System (CMAS) notifications.

The MME of the core network is responsible for initiating the paging procedure to an idle UE in the case of PS data connections and CS fallback connections. It does this by forwarding a so-called S1AP: Paging message to one or more base stations. S1 is the interface that connects base stations to the core network in the LTE environment.

Figure 3:
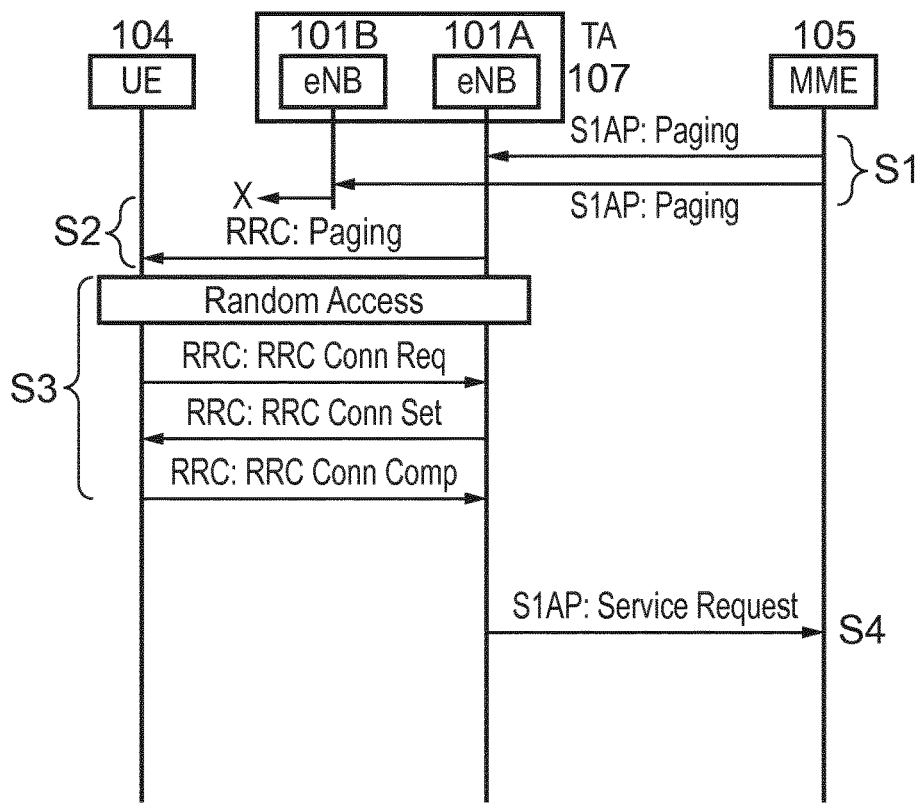
FIG. 3 shows a signalling ladder diagram representing a conventional paging procedure.

FIG. 3 is a signalling ladder diagram representing a conventional paging procedure for a terminal device 104 operating within the example LTE-type network schematically represented in FIG. 1. FIG. 3 schematically represents signalling and operating functions associated with the terminal device 104, the base stations 101A, 101B comprising the tracking area 107, and the core network, in particular the MME 105.

For the sake of this example it is assumed the UE 104 has attached to the network through base station 101A within the tracking area 107. As is well known, the specific base station through which the terminal device initially attaches may be determined from reference signal measurements, and so forth, whereby the terminal device determines which base station is most appropriate. After the procedure for attachment, the core network assigns an IP address for the UE. From this point onwards the core network will recognise the existence of the terminal device and keep track of its location at a tracking area level as discussed above. Thus, in this particular example, the core network identifies the terminal device as being within tracking area 107 (because the terminal device has accessed the network through base station 101A, which is within tracking area 107). In this example, it is assumed the UE 104 has not moved to a different tracking area and so has not provided any tracking area update. Hence the core network 102 continues to assume that the terminal device is located somewhere within tracking area 107.

Having attached to the network, the UE 104 enters RRC idle mode. In the conventional paging procedure in LTE, an idle device periodically checks for paging messages broadcast on a paging channel, with a frequency set by the cycle of the Discontinuous Receive (DRX) mode so that a check happens each time the device wakes up for its DRX active time. This is known as a paging occasion, and in it the UE decodes resource allocation information in a Physical Downlink Control Channel (PDCCH) and finds the paging message in an associated Physical Downlink Shared Channel (PDSCH).

Considering FIG. 3, the MME 105 recognises that a paging instance has arisen for the UE 104 which is in idle mode. The specific reason for the paging requirement is not significant, and may, for example be because a third party is seeking to place a telephone call to the UE 104. The MME thus initiates a paging procedure to contact the UE 104.

As has been discussed above, the MME 105 in the core network 102 can recognise that the UE 104 is located in one of the communication cells 103A and 103B which comprise tracking area 107, but the MME 105 does not know which one. Accordingly, in step S1, the MME 105 sends a paging request message over the S1-AP interface to each of the base stations 101A and 101B associated with the tracking area 107. Thus, in this example the MME 105 sends paging request messages to both base stations 101A and 101B. The MME 105 does not send a paging request message to the base station 101C serving communication cell 103C because communication cell 103C is not within tracking area 107 in which the terminal device is taken as being located.

All base stations receiving a paging request message from the MME 105, in this case base stations 101A and 101B, are configured to then transmit paging signalling to seek to establish contact with the required terminal device 104. This is schematically represented in FIG. 3 in step S2. The paging signalling is an RRC: Paging message format, since this communication stage is between the eNB and the UE.

It is assumed for this example that the idle UE 104 has remained within the coverage area 103A of base station 101A, and will be checking for paging messages. It therefore receives the paging signalling transmitted in step S2 by base station 101A, as a paging occasion. The paging signalling sent in step S2 by base station 101B is of course not received by the UE 104, and so this is in effect wasted signalling.

After receipt of the paging signalling by the UE 104 in step S2, the UE 104 needs to establish a RRC_CONNECTED state with the eNB, so the Random Access procedure (conventional under LTE) is performed, shown in step S3 of FIG. 3. Conventionally, Random Access, being an RRC connection establishment procedure initiated by a UE, comprises a RRC Connection Request message from the UE to the eNB, a RRC Connection Set-up message from the eNB back to the UE, and a RRC Connection Complete message from the UE to the eNB. The UE 104 has now transitioned in an RRC_CONNECTED state.

Finally, in step S4, the eNB 101A uses the S1 interface to send a Service Request message to the MME 105. This informs the MME that the UE has been successfully contacted and is able to receive data.

Thus, FIG. 3 schematically represents a conventional manner for paging terminal devices in RRC idle mode in a wireless telecommunications system. In summary, this conventional paging scheme involves all base stations in a given tracking area having to transmit paging signalling because it is not known where in the tracking area the terminal device is located. This produces wasted paging signalling.

According to embodiments of the present invention, it is proposed that the presence of one or more virtual or local cells may be used to reduce the amount of wasted paging signalling. The issue of redundant and excessive messaging in conventional paging is addressed by incorporating virtual cells into the paging procedure. To achieve this incorporation, it is proposed to define virtual cell tracking areas, and enable a virtual cell to assume responsibility for paging any UEs within its coverage area.

This arrangement may provide a range of benefits, including:

Providing more precise UE location information for UEs in both ECM_IDLE and ECM_CONNECTED states. At present, the location of a UE in ECM_IDLE and RRC_IDLE is known by the MME on a per tracking area basis. The conventional tracking area covers a wide range that is composed of several eNB cells. If, instead, virtual cells are established, the position of each being known (because each VC_UE is in RRC_CONNECTED mode), we can define virtual cell specific tracking areas (corresponding to the coverage of the virtual cell). Adding paging between a virtual cell and a UE to the paging procedure, even an idle UE can be located using its tracking area defined on a per virtual cell basis. For UEs in ECM_CONNECTED, the UE location is known in the MME with an accuracy of a serving eNodeB identification (ID). Again, with the addition of paging between the virtual cell and the UE, the UE location is known as precisely as the virtual cell. This accurate location information will be useful for location-based applications and for tracking area resource allocation schemes.

Reduction of the signalling between the MME and the eNBs. Currently, to page a UE, the MME has to forward the S1AP paging message to all eNBs within the relevant tracking area. The message quantity will increase if the UE is registered with more than a single tracking area. With the additional information provided by associating a UE to virtual cell tracking area, the MME can locate the single specific eNB which needs to receive the S1AP paging message. Hence the quantity of S1AP paging messages can be reduced dramatically.

Reduction of the signalling between UEs and the MME (and between UEs and the eNBs). The conventional tracking area update, by which the UE notifies the MME of its current tracking area, is performed by every UE individually. Instead, the virtual cell may receive the tracking area update messages from all the UEs within its range, and send a single message to the MME containing all the updated messages of its participating UEs. Hence the signalling between UE and MME will be reduced substantially.

Using virtual cells, a UE can be in the VC_RRC_IDLE state, just as it might be RRC_IDLE with the eNB if it is not in a virtual cell area. For UEs in VC_RRC_IDLE, a paging procedure is necessary to track the UEs' locations. As described above, to allow a reduction in network signalling, a virtual cell specific tracking area (VCTA) can be defined. Using this, it is possible to define a mapping rule such that each UE will have only one virtual cell tracking area code VCTAC (indicating which virtual cell it is in), and each VCTAC will have only one eNB identifier (ID) (indicating the eNB serving the VC). The MME may then quickly and simply find out which virtual cell the UE is currently camping on, and the paging message will be only sent to the associated eNB. As the virtual cell is connected with the eNB by RRC_CONNECTED mode, the paging message will be transitioned from the eNB to the virtual cell with RRC signalling. Following that, the virtual cell can send the paging message to the appropriate UE on the RRC paging channel, and the UE receiving the paging message will respond by initiating the RRC connection establishment procedure to establish VC_RRC_CONNECTED mode to the VC-UE. Once this is completed, the successful paging indication can be sent to the MME via the VC and the eNB. For the fault tolerance, the conventional eNB initiated paging procedure may be initiated following any indication of virtual cell paging failure. This might be by an actual notification of failure sent to the MME or eNB, or by expiry of a timer before the successful paging indication is received, for example.

Figure 4:
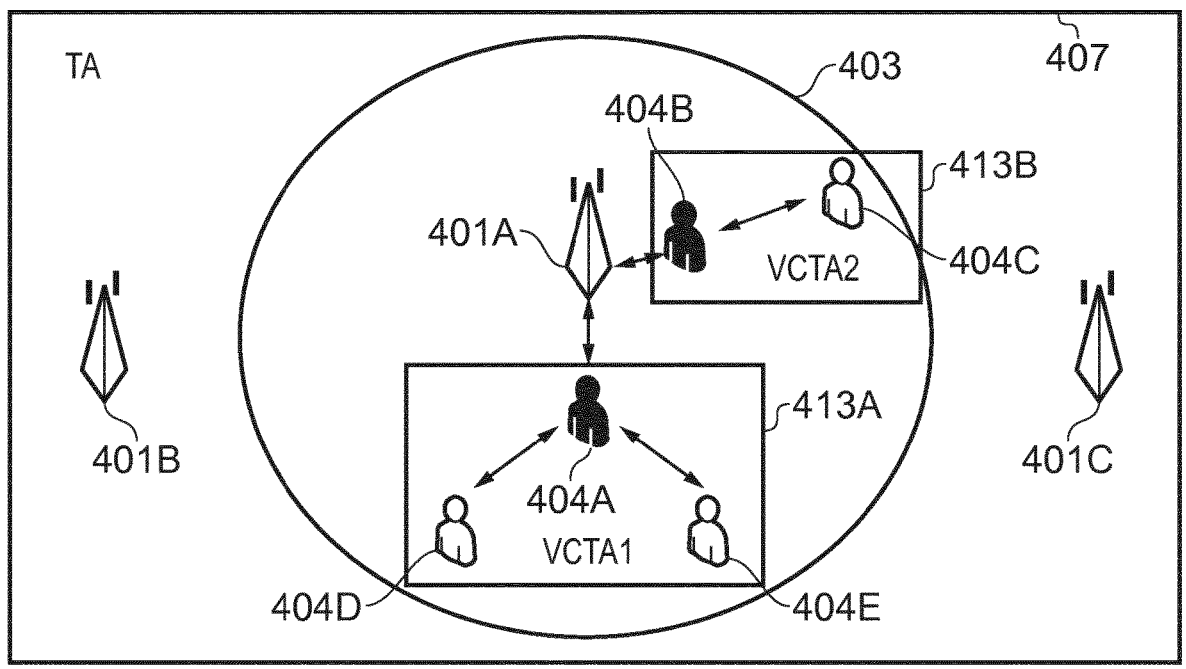
FIG. 4 shows a schematic representation of example tracking areas for use in a virtual cell paging procedure.

FIG. 4 shows a schematic representation of virtual cell tracking areas defined inside a conventional tracking area. This example shows three base stations, eNB 401A, B and C. Within the wider network (not shown), these base stations are grouped into a single conventional tracking area TA 407. Base station 401A provides wireless connectivity within a cell 403. At the illustrated time, the eNB 401A has designated two UEs 404A, B to operate virtual cells 413A, B. UE 404A becomes VC-UE 404A and provides connectivity to UEs 404D, E in virtual cell 413A, and UE 404B becomes VC-UE 404B and provides wirelessly connectivity to UE 404C in virtual cell 413B. Once the virtual cells are established, virtual cell tracking areas can be defined. Conveniently, the virtual cell tracking area is a geographical area (not fixed, owing to mobility of the VC-UE) that may correspond substantially with the coverage area of the virtual cell, although this is not essential. Virtual cell coverage or range depends on the output power of the VC-UE. Typically, this might be around 300 m range centred on the VC-UE, but the invention is not limited to this size. In the current example, virtual cell 413A provided by VC-UE 404A has a specific tracking area designated VCTA1 (for virtual cell tracking area 1), and the virtual cell 413B provided by VC-UE 404B has a specific tracking area designated VCTA2.

To utilise the virtual cell tracking area, we introduce a virtual cell tracking area identity VCTAI that identifies an individual virtual cell tracking area. The identity may be defined in any convenient manner that allows appropriate directing and delivery of paging messages via a virtual cell tracking area. Two possible examples include a VCTAI that provides straightforward backward compatibility to conventional paging in the event that a virtual cell paging procedure is unsuccessful, and a less complex VCTAI that is not backward-compatible.

An example backward-compatible VCTAI is composed of the following elements: mobile country code (MCC), mobile network code (MNC), tracking area code (TAC) and virtual cell tracking area code (VCTAC). The MCC, also used in conventional paging, identifies the country in which the network (specifically, a public land mobile network (PLMN)) is located, and the value of the MCC is the same as the three digit MCC contained in the International mobile subscriber identity, IMSI.

The MNC, also used in conventional paging, is a code identifying the particular PLMN in which the virtual cell is operating. Again, its value is the same as the two or three digit MNC contained in the IMSI. The TAC, being the same as in conventional paging, is a fixed length code of two octets which identifies a tracking area within the PLMN in question.

Finally, the VCTAC, which is newly introduced and not used in conventional paging, is a unique code that identifies the virtual cell tracking area within the larger tracking area. Any convenient value may be selected for use as the VCTAC. For example, the mobile subscriber identification number (MSIN) of the VC-UE might be used.

By including the conventional MCC, MNC and TAC, the paging procedure can easily fall back to conventional paging to contact a UE if there is any error or failure in the virtual cell paging procedure. Such an error might be recognised, for example, if there is no paging response received from the UE within a pre-defined period.

An example non-backward compatible VCTAI is composed of the MCC, the MNC, and the VCTAC. In other words, it corresponds to the backward compatible version without the tracking area code. This does not allow a fall-back to conventional paging in the event of an error, but gives a shorter VCTAI. Since virtual cell paging proposes that conventional tracking areas are not used to find a UE, there is no requirement for a tracking area code to be included.

To implement paging via a virtual cell tracking area, the core network/MME should be informed of associations of UEs and virtual cells. This is a virtual cell tracking area initialization step. Once a UE is designated to connectivity provided by a particular virtual cell, either of the UE or the VC-UE or both can signal the MME with the relevant information. This can be done, for example, by a UL (uplink) information transfer such as by NAS signalling. NAS, or non-access stratum, messaging allows signalling between a UE and the MME. NAS messages are transferred via the eNB, but this acts only as a relay to forward the message, and does not interpret the message contents. In some cases, the eNB may know the association of the UE to the virtual cell, such as when the eNB has activated the virtual cell to serve a group of UEs. In this case, the eNB may notify the MME of the association using the S1 interface. This approach reduces the amount of NAS signalling by the individual UEs and VC-UEs. The association or relationship may be defined, for example, as UE→VC-TAC→eNB ID (i.e. the identity of the eNB). According to the association enabled by the virtual cell tracking area, multiple UEs may share a single VCTAC, and multiple VCTACs may share a single eNB ID. Conversely, each UE will have only one VCTAC, and each VCTAC will have only one eNB ID. Note that the mapping indicating this relationship is therefore different from the mapping resulting from conventional tracking areas. The MME can be informed of changes in association via an update procedure discussed further below.

So, the MME is notified of the mapping of each UE to a virtual cell and its virtual cell tracking area, and each virtual cell tracking area has a code VCTAC and an identity VCTAI that includes the code. Note that the MME may also maintain the conventional UE-tracking area association in addition to the UE→VCTAC→eNB association. When a service request for a UE arises and paging is necessary, the MME searches its stored associations and directs the paging request accordingly. That is, it will use a virtual cell paging procedure (as explained in more detail below) if a UE→VC-TAC→eNB mapping is available, and use conventional paging otherwise.

Within this arrangement, it is possible to perform paging of the UE via the virtual cell. The UE in the virtual cell may be in one of two RRC states: VC_RRC_IDLE and VC_RRC_CONNECTED. The VC_RRC_CONNECTED state indicates a successful RRC connection established with virtual cell, and is plainly useful. The VC_RRC_IDLE state also has benefits, which arise in situations where a full RRC connection is not needed. These include:

Ability of the UE to receive system information regarding operation of the virtual cell. The virtual cell may broadcast virtual cell specific system information, and without the VC_RRC_IDLE state, it is impossible without the use of particular complicated schemes for the UE to receive such specific system information if it is RRC_IDLE rather than VC_RRC_IDLE.

Application of virtual cell specific DRX in accordance with on-demand traffic characteristics. The current DRX configuration is cell specific. Without the VC_RRC_IDLE state, UEs in the virtual cell are unable to apply specific DRX configurations. Virtual cells are typically employed in response to a dense UE scenario and on-demand applications, so it is useful to configure the DRX parameters according to the service requirement and characteristics even in for UEs in an IDLE state.

Application of measurements for virtual cell reselection. The virtual cell and the UE each have unpredictable mobility, so that their association is unstable. In this context, it is useful for the UE to be able to perform virtual cell reselection; this can be done according to the configured measurements. These configurations can be readily signalled to the UE when it is in VC_RRC_CONNECTED state to provide up-to-date neighbour information, and it is desirable to continue to perform such measurements even in IDLE state. Without VC_RRC_IDLE state, it is difficult without extra signalling for the UE to continue these measurements.

Since it is desirable to maintain the UE in VC_RRC_IDLE to retain the associated functionality, we introduce a virtual cell paging procedure configured for the UE in VC_RRC_IDLE state. The UE may enter into VC_RRC_IDLE state in various situations, including:

1. A RRC_CONNECTED UE which is designated to join a virtual cell (instructed by the eNB, for example) or which has received a notification message from the virtual cell but not yet started to establish the RRC connection thereto, will enter into VC_RRC_IDLE first.
2. A UE in VC_RRC_CONNECTED which has not participated in certain activities such as user data transfer for a pre-defined period will enter VC_RRC_IDLE.
3. An RRC_IDLE state UE which moves into the virtual cell range will transition into the VC_RRC_IDLE state.

Figure 5:
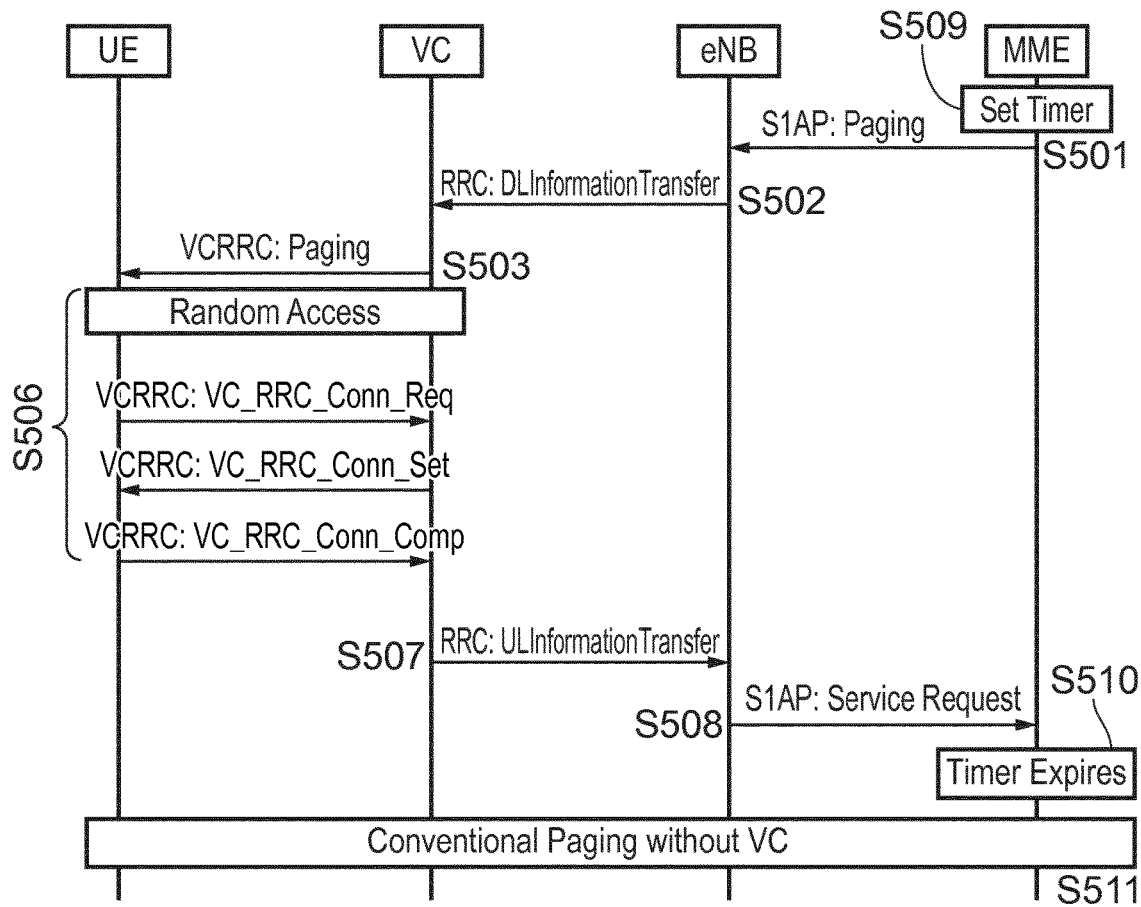
FIG. 5 shows a signalling ladder diagram representing steps in an example virtual cell paging procedure.

For situations 1 and 2, an example procedure to page an idle UE (ECM_IDLE, RRC_IDLE, VCRRC_IDLE) using the virtual cell is now described. FIG. 5 shows a signalling ladder diagram representing the steps in this procedure. Recall that, because the UE has been in a RRC_CONNECTED state, the MME has already been notified of the mapping in the virtual cell tracking area initialisation step as described above. When paging is required, in a first step S501 the MME sends a S1AP paging message to the appropriate eNB for the UE of interest, according to the UE→VCTAC→eNB mapping it has previously received. The paging message includes the VCTAI. In step S502, the eNB sends an RRC paging message to the appropriate virtual cell, as indicated by the VCTAI. This may be an RRC: DLInformationTransfer signal. As a final stage in reaching the UE, in step S503 the virtual cell sends a paging message to the UE, in the form of a VC_RRC paging message. If the UE receives the paging message from the VC_UE, in step S506, a random access procedure is performed to establish a VC_RRC_CONNECTION state for the UE. This may be carried out in a similar way as the random access procedure in conventional paging described above with respect to FIG. 3, except that the signalling is VC_RRC signalling instead of RRC signalling since the UE is in a VC_RRC state to the virtual cell instead of an RRC state to the eNB.

Once the random access procedure is complete, so that the UE is VC_RRC_CONNECTED, in step S507 the virtual cell responds by signalling the eNB, for example by sending a RRC: ULInformationtranser signal to the eNB, to indicate that the paging request has been successful. This is followed by step S508, in which the indication of successful paging is passed from the eNB up to the MME on the S1 interface, as an S1AP:Service Request. The S1 signalling between the MME and the eNB can be the same as in conventional paging. Once the MME (or possible the eNB in some examples) receives the response (such as the service request), the paging procedure is finished.

To manage the possibility that paging is not successful, the MME may be configured to start a timer when it sends the S1AP: Paging message in step S501. The timer has a fixed duration sufficient to encompass a successful paging procedure from step S501 to step S508. i.e. an expected typical timespan for a successful paging procedure. FIG. 5 shows the timer being set in step S509 shortly before the S1AP paging message is sent; it could be set simultaneously or just after instead. The effect is that the starting of the timer is associated with the transmission of the paging message. In a successful paging procedure, the service request is received at the MME before the timer expires, and it can be turned off (and reset ready for a next paging procedure). However, it may be that the timer expires (step S510) before a service request is received. This is deemed to indicate that paging of the UE has failed. In this event, the MME falls back to conventional paging based on the conventional tracking areas, and resends the paging message with the intention of achieving paging without participation of the virtual cell (step S511). If the backward compatible VCTAI has been used to identify the virtual cell, this fall-back is simplified. Otherwise the conventional tracking area identity (TAI) can be used. Once the timer has expired, the MME can delete the UE→VCTAC→eNB association or mapping that it has previously received and stored; failure of the paging procedure indicates that the mapping is not longer valid.

Figure 6:
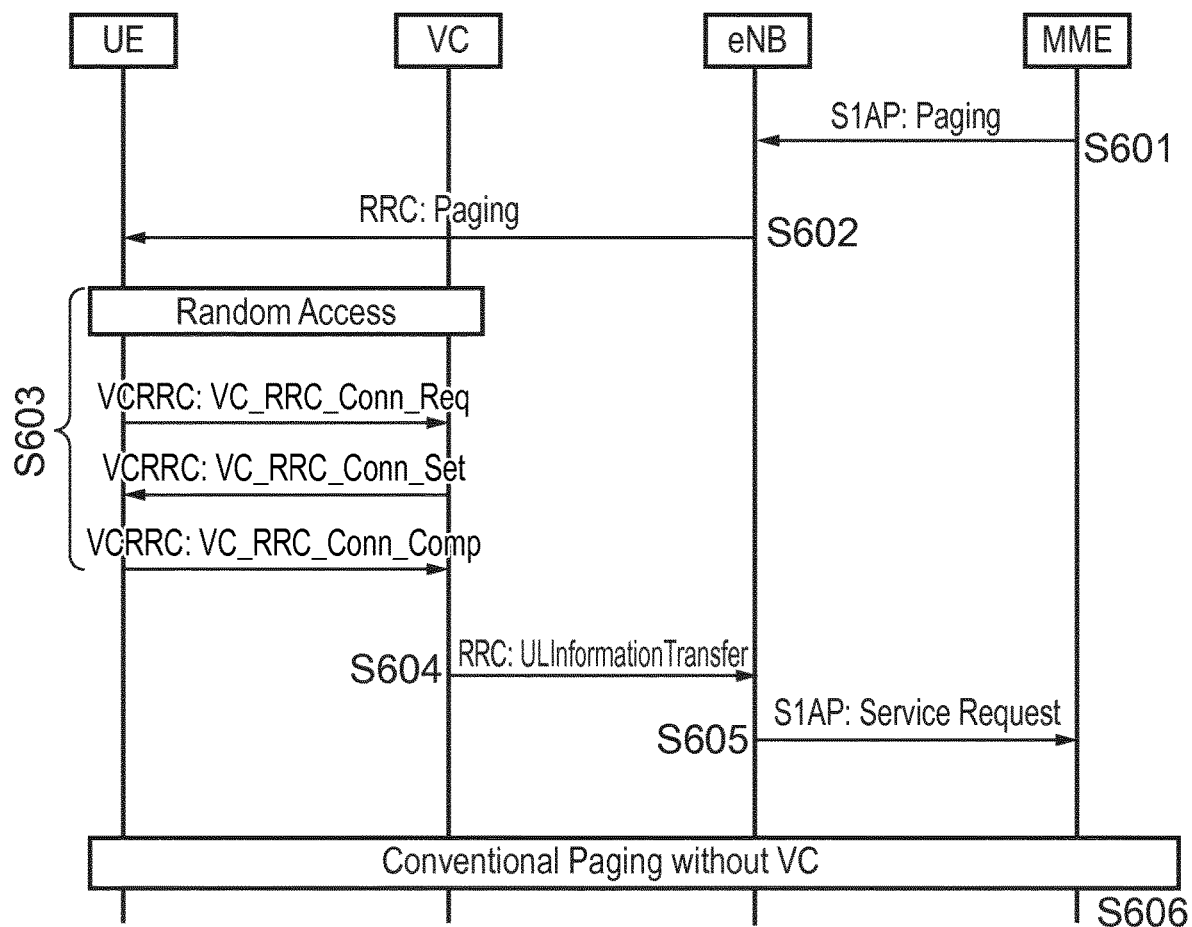
FIG. 6 shows a signalling ladder diagram representing steps in a second example virtual cell paging procedure.

For situation 3 outlined above, or other situations in which the UE-virtual cell association may not be updated to the MME in real time (for example if the VC-UE is powered off or the UE moves out of range of the virtual cell and a new virtual cell does not recognise this), a different paging procedure can be employed. FIG. 6 shows a signalling ladder diagram of steps in an example of such a procedure. In this situation, the eNB or the MME initiates paging contact with the UE (without signalling via the virtual cell), and this prompts the UE to establish a VC_RRC connection with the virtual cell.

Starting at step S601, the MME sends the S1AP paging request to the appropriate eNB, using the most recent UE→VCTAC→eNB mapping it has received. We assume that the UE remains in the eNB cell even though the current virtual cell association may have changed without notice. The eNB sends an RRC paging message to the UE in step S602. In response, the UE initiates a VC_RRC_CONNECTED state transition to the virtual cell, using the random access procedure as before (step S603). In response, once the VC_RRC_CONNECTED state is established, the virtual cell notifies the eNB in step S604 via a RRC: ULInformationTransfer message as before. Finally, again as before, the eNB sends a S1AP service request message to the MME (step S605), whereupon the MME knows that the paging procedure has been successful. As with the example procedure in FIG. 5, the MME may run a timer (not shown) and use this to determine the success or failure of the paging procedure. In the event of failure, it can fall back to conventional paging (step S606), as in FIG. 5.

During the random access procedure when the UE is establishing a VC_RRC_CONNECTED state with the virtual cell in response to the RRC paging message from the eNB, the UE may indicate that the establishment cause of the RRC connection request (where the RRC connection establishment procedure includes an establishment cause, as is known) is "eNB/MME triggered VC paging". With this indication, after the successful RRC connection establishment, the virtual cell will know that it should send a suitable paging response, such as a service request, to MME (to be transferred by the eNB).

From the perspective of the UE, it can be configured to simultaneously monitor both the paging channel of the eNB and the paging channel of the virtual cell, so that it will receive paging messages under either a FIG. 5 or a FIG. 6 procedure. These two paging channels are separated. Alternatively, it can be configured to monitor one of the channels only, selected according to its state transition as indicated in situations 1, 2 and 3. Thus, if the UE is aware that its virtual cell association has not be notified to the MME, it can monitor the eNB paging channel. If connection with a virtual cell is then established, and an association notification made to the MME, it can switch to monitoring the virtual cell paging channel.

As described above, the eNB may not be aware that the UE has entered the virtual cell's range and transitioned to VC_RRC_IDLE, if the UE has been in RRC_IDLE. In order to make the eNB aware of the current UE state, an option is that once the RRC_IDLE UE enters into the range of a virtual cell, it enters VC_RRC_IDLE. Then it initiates the VC_RRC connection establishment with the virtual cell. The successful RRC connection prompts the virtual cell to update this information (that is, the association of the UE to the virtual cell) to the eNB to notify it that the UE is currently in its range. Also, the virtual cell may send NAS signalling to the MME to update the UE→VCTAC→eNB association. Alternatively, the eNB may send the update information to the MME via the eNB-MME interface, which may be the S1 interface, for example.

As discussed, when the MME needs to page a UE, it sends a paging message to the eNB. Because the UE and its virtual cell are already registered at the MME according to the VCTAC and eNB mapping, the MME only sends the paging message to the associated eNB. Thus, the need under conventional paging for the MME to send multiple paging messages to all eNB in the appropriate tracking area is removed. Signalling overhead on the eNB is greatly reduced. In the LTE environment, the paging message can be a S1AP paging message, and can be configured with a message structure the same as or similar to the conventional S1AP paging message structure, except for the inclusion of the VCTAI in the message. The VCTAI enables the eNB to direct the paging message to the correct virtual cell.

As described with regard to FIG. 5, in some examples the paging procedure includes a step S502 in which the eNB sends an RRC: DLInformationTransfer message to the virtual cell. The VC-UE is assumed to be in the RRC_CONNECTED state; this is different from the conventional scheme where a UE receiving a paging message from an eNB will be idle. The RRC_CONNECTED state allows RRC signalling such as a DLInformationTransfer to be used to transfer the MME's paging request from the eNB to the virtual cell.

As an alternative to a simple transfer forwarding to the paging message, the eNB could reconstruct a new RRC signalling message which contains the S1AP paging contents, designated a VC-UEPaging message for example, and send it to the virtual cell.

As a further alternative, in the event that the virtual cell is allowed to be in RRC_IDLE, a conventional paging procedure can be executed to communicate with the virtual cell. The virtual cell will monitor the relevant paging channel used by the eNB, checking paging occasions to decode the resource allocation information in the PDCCH channel and find any paging messages in the associated PDSCH channel. After decoding the paging message, the virtual cell should initiate the RRC connection establishment procedure with the eNB, but note that, unlike the conventional paging procedure where the virtual cell will also perform this process, the virtual cell need not include NAS signalling to the eNB in the RRC_Connection_Setup_Complete message. The virtual cell will send the paging message to the UE instead.

In general therefore, the step S502 can be considered as a signalling step in which the content of the S1AP paging message is delivered from the eNB to the virtual cell, where several options are available for packaging the content for delivery.

Once the virtual cell has received the paging message, it needs to pass the paging message to the idle UE, as in step S503 of FIG. 5. Using a VC_RRC paging channel, the virtual cell will transmit the paging message for receipt in the UE's paging occasion. This can be similar to paging of the UE by the eNB in conventional paging. It is possible to indicate a system information change of the virtual cell (if any) in the paging message as well. In an example, the contents of the VCRRC:Paging message may include PagingRecordList and SystemInfoModification. Once the idle UE receives the paging message, for each of the PagingRecord, if the UE-Identity in PagingRecord matches the UE identity allocated by the upper layer, it will forward the UE-Identity and CN-Domain to the upper layers. At the same time, if the SystemInfoModification is set in the paging message, the UE can re-acquire the virtual cell system information (if any).

In some examples, the virtual cell may start a timer to wait for the response from UE. If the timer expires before the UE responds, an indication can be sent from the virtual cell to the eNB, and possibly forwarded to the MME. This is an active way to indicate paging failure to the MME, in contrast with the passive approach of the MME timer included in FIG. 5.

Assuming a successful paging procedure, the virtual cell will have established the VC_RRC_CONNECTED state with the UE. Following this, the virtual cell passes an indication of the success back to the MME. This might be by using NAS signalling of, for example, a service request in ULInformationTransfer, to the eNB. In accordance with NAS procedures, the eNB will merely relay the service request to the MME. Alternatively, the virtual cell could re-construct a new RRC signalling message which contains the paging indication (successful or not), for example designated as VC-UEPagingResponse message, and send it eNB. Thus, step S507/S604 can be implemented in any way that conveys the necessary confirmation of paging success from the virtual cell to the eNB.

Finally, step S508/S605 is the sending by the eNB of a suitable S1AP message to the MME to indicate the successful paging procedure. This might be relaying of a service request sent to the eNB by NAS signalling, or the eNB could construct a new message.

The optional use of a timer by the virtual cell to monitor for a response from the paged UE was discussed above. The virtual cell can signal a paging failure to the eNB if the timer expires, and then, optionally, the eNB could initiate a conventional paging procedure, rather than the MME performing this task. This requires adoption of the backward-compatible VCTAI, however.

Within the above example virtual cell paging methods, accuracy can be enhanced by the inclusion of suitable update procedures for the UE to update its location to other network elements so that paging messages can be properly directed to it. This can reduce instances of paging failure and so reduce the need to fall back to conventional paging as discussed above. Appropriate configuration of the update procedures can reduce the amount of messaging required to implement the updates.

Updating of this type is known in conventional paging, and is referred to as a tracking area update, whereby a UE sends regular or intermittent updates to indicate its current tracking area. Conventionally, this tracking area update (TAU) is triggered by a timer running on the UE, or movement of the UE into a new tracking area. Once the trigger is activated, the UE sends a tracking area update to the MME (for example by NAS signalling). In the present disclosure, virtual cell tracking areas (VCTA) have been defined for paging, so alternative update procedures are proposed.

Ideally, UE location information at the MME is maintained with a high degree of accuracy so that paging is always accurately directed to the required UE. However, this can require a large burden in update messaging, for example in the case of a highly mobile UE that frequently changes its location. Hence, there is a trade-off between paging accuracy and tracking area update cost. With this in mind, the present disclosure proposes a layered approach to updates, in the context of virtual cell tracking area updates (VCTAU). Here it is supposed that the MME already knows the UE→VCTAC→eNB association from the original notification in the virtual cell tracking area initialization step explained above. The VCTAU can comprise two levels or layers, namely an eNB level update and a MME level update. If the UE has moved to a different VCTA but stays in the coverage of the same eNB, the UE (or the virtual cell it is associated with) need only report the VCTAU to the eNB; this is an eNB level update. Note that this change can arise because of movement of the UE or of the VC_UE. However, if the UE moves out of coverage of its serving eNB to a new eNB (and will necessarily have also changed to a different virtual cell and VCTA, if any), the UE should send a VCTAU message to the MME to notify the update.

The proposed use of VCTAU may found to be useful for a number of reasons. With the proposed two level update procedure, for the MME the tracking area accuracy can be maintained at the eNB level at least, while for the eNB it can be maintained at the virtual cell level. This level of accuracy is in accordance with each entity's functionality. From the MME's point of view, it only needs to know to which eNB it should send the paging message for a specific UE (in accordance with the example virtual cell paging methods described above). From the eNB's point of view, it should preferably know which virtual cell any UE camps on, not only for paging purposes but also for other functions including resource allocation and handover assistance. Furthermore, with the proposal, the update message size can be the same or similar to those for the conventional tracking area size of one or more eNBs, but the paging accuracy is improved to the virtual cell location level.

For good accuracy, the virtual cell tracking area update should be performed by all UEs associated with a virtual cell, regardless of whether they are in the VC_RRC_IDLE state or the VC_RRC_CONNECTED state. To implement the updating, a UE can be configured to perform VCTAU if one of several conditions occurs. Occurrence of one of these conditions can be considered as a trigger for the update to be made. For example, an update can be made 1. when the UE enters into a new VC tracking area (determined by the UE reading the system information of the new virtual cell, for example); or
2. when the UE enters into coverage of a new eNB; or
3. when a periodic VCTAU timer expires.

So, the condition can be an event trigger, as in examples 1 and 2, or a timer trigger, as in example 3.

To implement a timer trigger, one may configure a timer for each virtual cell. This might be done through RRC signalling from the eNB to the VC-UE, for example. Then, the configuration of the timer could be broadcast in the system information of the virtual cell, or sent by a virtual cell notification message. In this way, the timer configuration is delivered to the UEs in the virtual cell. The timer is reset and started when a UE moves from the VC_RRC_CONNECTED state to VC_RRC_IDLE state, and is stopped for the opposite transition from VC_RRC_IDLE to VC_RRC_CONNECTED. So, the timer runs only while the UE remains idle within the virtual cell. Once the timer expires, the UE should initiate a VCTAU. Note that the duration or period selected for the timer might be different according to different virtual cell characteristics. For example, a virtual cell deployed in a hotspot (where there is likely to be high and frequent device mobility) could be configured with a relatively shorter duration than a virtual cell implemented in an office environment (where device mobility will typically be less). In an extreme case, the timer might be deactivated for a static UE and virtual cell, for example if it is found that neither the UE or the VC-UE has moved for a long time, perhaps a predefined number of timer cycles.

To implement an event trigger, consider that the UE in the VC_RRC_IDLE or VC_RRC_CONNECTED may move among virtual cells, and even among eNBs. When the movement to a new VCTA or eNB has been detected (for example from the system information of the virtual cell and the eNB, and any tracking area information stored in the UE), different levels of VCTAU may be triggered according to the range and type of movement.

Figure 7:
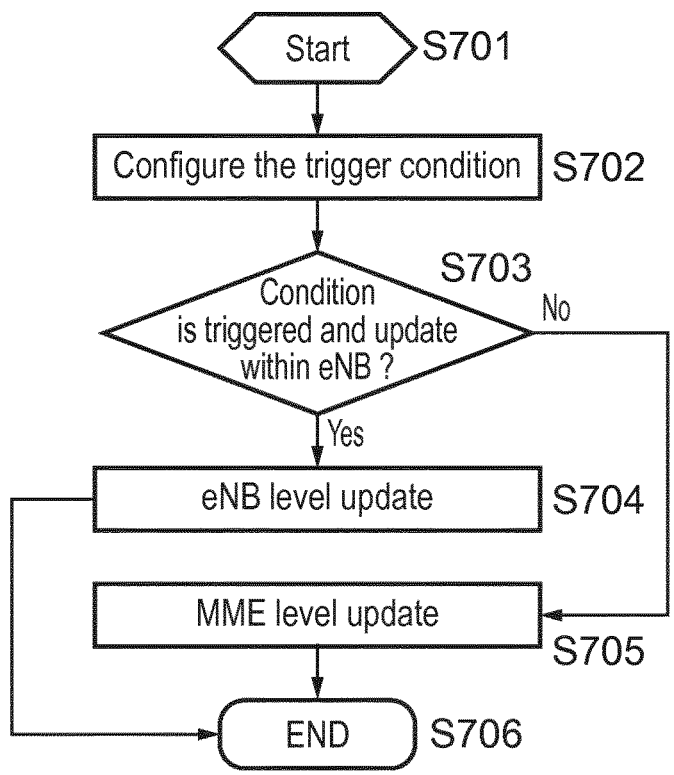
FIG. 7 shows a flow chart of steps in an example virtual cell tracking area update procedure.

FIG. 7 shows a flow chart of an example VCTAU procedure. The procedure starts at step S701, and proceeds to step S702 where the nature of the trigger condition is configured, i.e. a timer trigger or an event trigger, or both. At decision S703, the trigger has been activated (by movement or by expiry of the timer), and a test is made to see whether the UE has remained within the coverage of the same eNB. If yes, the UE is still with the same eNB, an eNB level update is sufficient and this is made in step S704. If no, the UE has moved to a new eNB, an MME level update is appropriate and this is made in step S705. Then, following the sending of the virtual cell tracking area update, the procedure ends at step S706.

A UE may make an individual update report. We consider in more detail an event trigger under condition 1, where a new VCTA has been identified by the UE, but the UE is still within the coverage of the same eNB. In this case, the UE needs to send the update message or report to the eNB. The report can be defined as a Single Immediate VCTAU Report.

Figure 8:
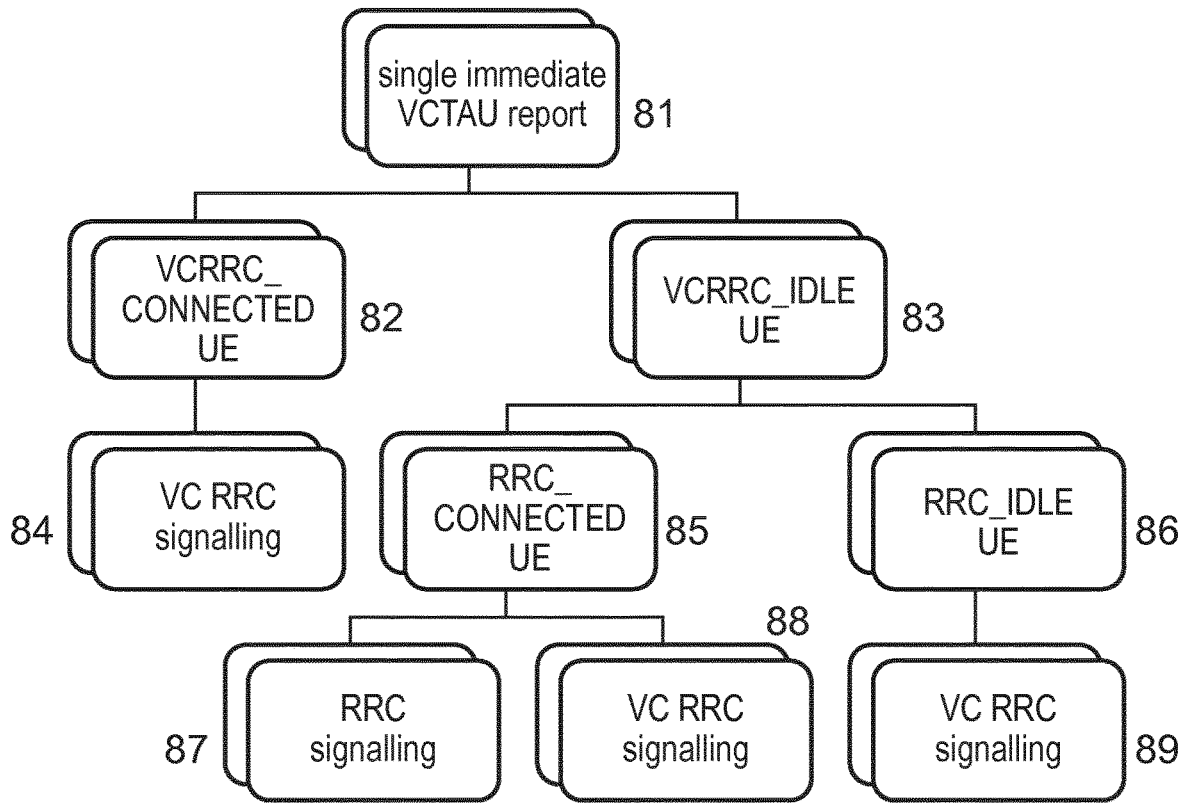
FIG. 8 shows a relationship tree diagram of conditions for example virtual cell tracking area update messaging arrangements.

The arrangement for sending the single immediate VCTAU report will depend on the RRC state of the UE, including both the RRC state with the new virtual cell and the RRC state with the eNB. FIG. 8 shows a relationship tree indicating the various conditions for update reporting depending on the connection states currently in force if both a VC_RRC and a RRC connection state is in place, for eNB level reporting. Under the various circumstances, the update report can be sent as follows:

If the UE is in VC_RRC_CONNECTED with the new virtual cell in the new VCTA (regardless of the connection state with the eNB), it can report to the new virtual cell with VC_RRC signalling. The new virtual cell responds by reporting the new UE-VC association to the eNB with RRC signalling. This follows the relationship 81-82-84 in FIG. 8.

If the UE is in VC_RRC_IDLE with the new virtual cell in the new VCTA but happens also to be in RRC_CONNECTED with the eNB, the UE can use this RRC connection to report the new UE-VC association directly to the eNB with RRC signalling. This follows the relationship path 81-83-85 87 in FIG. 8. The virtual cell need not participate. As an alternative, the UE may initiate VC_RRC connection establishment with the new virtual cell, indicating the VCTAU (under an event trigger) in the establishment cause. After successful VC_RRC connection establishment, the virtual cell responds to the notified establishment cause by reporting the update to the eNB with RRC signalling. This follows the path 81-83-85-88 in FIG. 8.

If the UE is in VC_RRC_IDLE with the new virtual cell and in RRC_IDLE with the eNB, the UE cannot immediately make the update. It should try to establish the VC_RRC connection with the new virtual cell, indicating the VCTAU (event trigger) as the establishment cause, in response to which the virtual cell will report the update to the eNB with RRC signalling. FIG. 8 shows this as path 81-83-86-89.

We also consider the situation where the UE only has one connection state, with either the eNB or the virtual cell (there is a VC_RRC state or a RRC state only, with no other connection option available). The update report can be sent as follows:

If the UE is in VC_RRC_CONNECTED with the new virtual cell in the new VCTA, it will report to its new virtual cell with VC_RRC signalling. The new virtual cell will report the new association to the eNB with RRC signalling. This is the same as path 81-82-84 in FIG. 8.

If the UE is in VC_RRC_IDLE with the new virtual cell, it should initiate the VC_RRC connection establishment with the new virtual cell and indicate the VCTAU (event trigger) in the establishment cause. After the successful VC_RRC connection establishment, the virtual cell will report the new association to the eNB with RRC signalling. This corresponds to the path 81-83-88 in FIG. 8 (with stage 85 omitted).

If the UE is in RRC_CONNECTED with the eNB, the UE can report the new virtual cell association directly to eNB with RRC signalling. This corresponds to the path 81-85-88 in FIG. 8 (with stage 83 omitted).

If the UE is in RRC_IDLE, the UE will initiate an RRC connection establishment with the eNB and indicate the VCTAU (event trigger) in the establishment cause. After the successful RRC connection establishment, the UE will report directly to the eNB. This corresponds to path 81-86-87 in FIG. 8.

Figure 9:
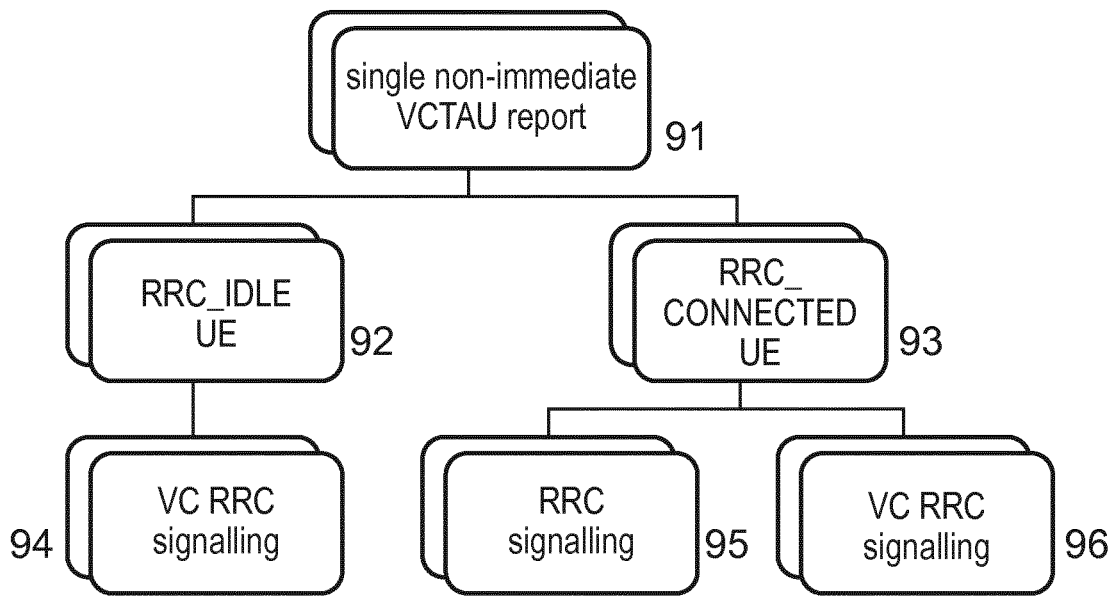
FIG. 9 shows a relationship tree diagram of conditions for further example virtual cell tracking area update messaging arrangements.

Considering further the option of a timer trigger to cause the VCTAU, we can define a Single Non-immediate VCTAU report (non-immediate since it can only occur periodically according to the timer expiry). Recall that the timer only runs when the UE is in VC_RRC_IDLE, so the timer trigger can only occur for a VC_RRC_IDLE UE. Options for sending the update report therefore depend only on the RRC connection state of the UE to the eNB. FIG. 9 shows a relationship tree indicating various conditions for update reporting for single non-immediate VCTUA reporting at the eNB level. The compulsory condition of VC_RRC_IDLE means that there are fewer alternatives than for the single immediate VCTAU report. The single non-immediate update report may be sent as follows:

If the UE is in RRC_CONNECTED with the eNB, the UE will send the VCTAU message to the eNB with RRC signalling. The VCTA may remain same, but the UE should still notify the network that is able to be paged. This is path 91-93-95 in FIG. 9. As an alternative, the UE could initiate a VC_RRC connection establishment with the virtual cell and indicate the VCTAU (under a timer trigger) in the establishment cause, and use the VC_RRC connection to report the association to the virtual cell, which then reports to the eNB. This is the path 91-93-96 in FIG. 9.

If the UE is in RRC_IDLE, the UE can initiate establishment of a VC_RRC connection with the new virtual cell, indicating the VCTAU (under a timer trigger) in the establishment cause, and use the VC_RRC connection to report the association to the virtual cell, which then reports to the eNB. This is the path 91-92-94 in FIG. 9.

Now consider how the virtual cell might perform its part in the reporting, namely passing on the update reports received from UEs. While it is envisioned that UEs will employ individual update reporting, a virtual cell may alternatively or additionally employ group update reporting. A virtual cell may move within the coverage of an eNB, so that the UEs supported by the virtual cell may change. Additionally, movement of UEs may cause a similar change. The virtual cell maintains a list of its associated UEs, and the list will change accordingly. The movements and the fluctuating list will mean that the virtual cell may receive a substantial number of VCTAU messages from the UEs in a short time period. A large messaging overhead will arise if the virtual cell passes the update messages to the eNB one by one as they are received from the UEs. To address this, the virtual cell may group some or all of the received individual update messages into one group VCTAU message, and send this to the eNB. The grouping may be of messages received from a defined group of UEs within the virtual cell, or by messages received from all UEs in the virtual cell during a set time, for example. This grouped message can be defined as a Group Immediate VCTAU report.

A different situation arises if an old virtual cell assists all the UEs within its range to handover to another virtual cell, for example if the old virtual cell operation is being terminated. Different virtual cell tracking areas for the different virtual cells will cause a change in the VCTA for each UE, which should be reported. The new virtual cell can compose and send a group immediate VCTAU report instead of individual ones corresponding to the update messages from each UE.

For an immediate report, be it a single/individual report or a group report, the virtual cell will send them to the eNB using RRC signalling as soon as the report is received from the UE or generated by the virtual cell.

For single non-immediate reports, the virtual cell might optimize the sending of these reports by, for example waiting to combine them with the next group immediate VCTAU report. Alternatively, the virtual cell may start a predefined timer and begin collecting single non-immediate reports so that once the timer expires, the virtual cell will compose all the received reports in a single message so that it can send all the non-immediate reports together. We can define this as a Group Non-immediate VCTAU report. Choice of which reporting method should be used by the virtual cell can be made by considering the appropriate balance between update accuracy and signalling overhead. Note that, as described above, an idle UE which seeks to establish a VC_RRC_CONNECTION to the virtual cell to perform an update report may include in the establishment request that the VCTAU is the establishment cause. By indicating an event trigger or a timer trigger as the cause, the virtual cell can distinguish between immediate and non-immediate reports, and group reports accordingly.

Figure 10:
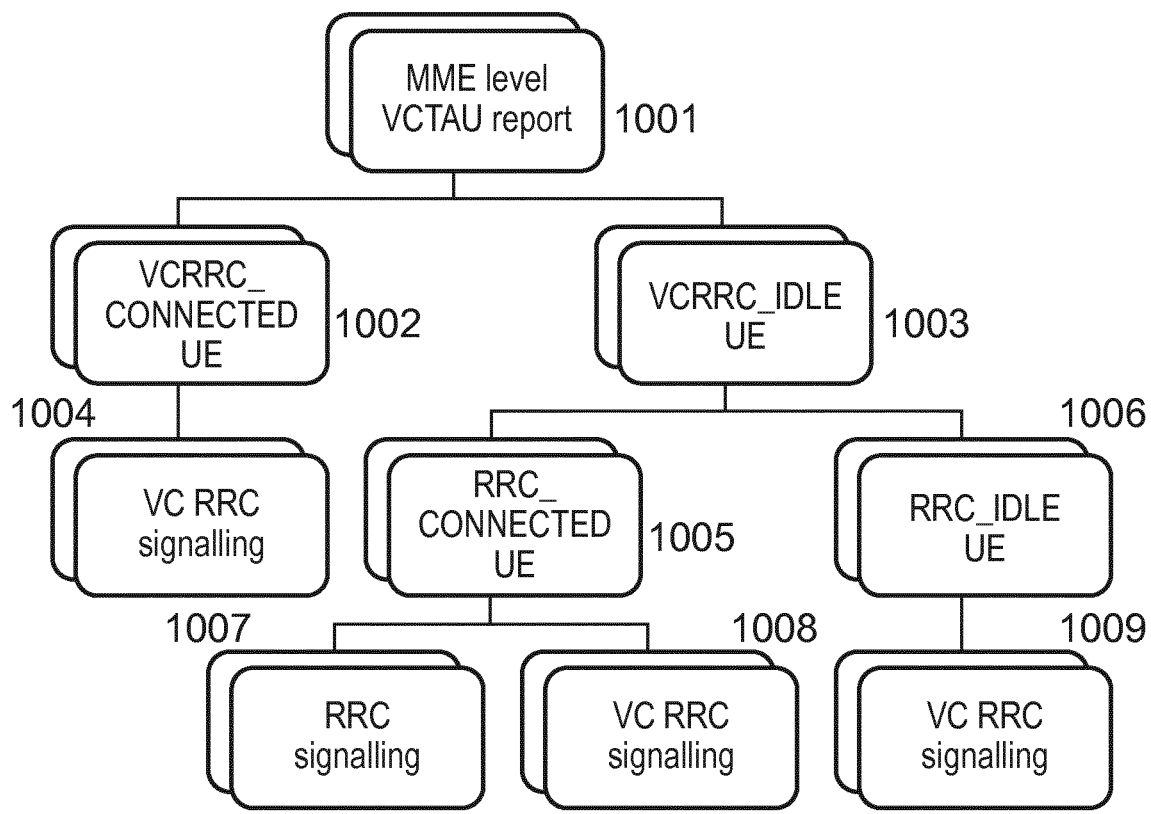
FIG. 10 shows a relationship tree diagram of conditions for further example virtual cell tracking area update messaging arrangements.

Thus far we have considered the eNB level update reporting layer of the proposed VCTAU scheme. Recall that there is also a MME level update reporting layer for use when a UE moves between eNB coverage areas. When a UE moves out the coverage of its old eNB and hands over to a new eNB and virtual cell, its VCTA will necessarily change according to the definition of a VCTA. The reporting procedure which is then appropriate will depend on the RRC state of the UE. FIG. 10 shows a relationship tree indicating various conditional update reporting options for MME level VCTUA reporting, the options including

- If the UE is in VC_RRC_CONNECTED with the virtual cell of the new VCTA (regardless of its connection state with the new eNB), it can report to its new associated virtual cell with VC_RRC signalling, and the virtual cell can use NAS signalling to report via the new eNB to the MME. This is shown as the path 1001-1002-1004 in FIG. 10.
- If the UE is in VC_RRC_IDLE with the virtual cell of the new VCTA but also happens to become RRC_CONNECTED to the new eNB, the UE can report the new virtual cell and eNB association to the MME with RRC signalling via the eNB using NAS signalling. This is shown as the path 1001-1003-1005-1007 in FIG. 10. Alternatively, it could initiate a VC_RRC connection establishment with the new virtual cell and indicate the VCTAU (event trigger) in the establishment cause. After the successful VC_RRC connection establishment, the virtual cell will use NAS signalling to report via the new eNB to the MME. This is shown as the path 1001-1003-1005-1008 in FIG. 10.
- If the UE is in VC_RRC_IDLE with the new virtual cell and RRC_IDLE with the new eNB, the UE can establish a VC_RRC connection with the new virtual cell, indicating the VCTAU as the establishment cause. After the successful VC_RRC connection establishment, the virtual cell will use NAS signalling to report via the new eNB to the MME. This is shown as the path 1001-1003-1006-1009 in FIG. 10.

We must consider also the case of MME level updates from a UE having only one RRC connection, that is, either an RRC connection with the virtual cell or an RRC connection with the eNB. Then the following reporting options are available:

- If the UE is in VC_RRC_CONNECTED to the new virtual cell in the in new VCTA, it can report to its new associated virtual cell with VC_RRC signalling, and the virtual cell can use NAS signalling to report via the new eNB to the MME. This is another instance of the path 1001-1002-1004 in FIG. 10.
- If the UE is in VC_RRC_IDLE to the new virtual cell, it can initiate the VC_RRC connection establishment with the new virtual cell and indicate the VCTAU (event trigger) in the establishment cause. After the successful VCRRC connection establishment so that the virtual cell is aware of the new UE-virtual cell-eNB association, the virtual cell will use NAS signalling to report via the new eNB to the MME. This corresponds to the stages 1001-1003-1009 on FIG. 10 (omitting stage 1006).
- If the UE is in RRC_CONNECTED, the UE can report the new virtual cell and eNB association to the MME with RRC signalling via the new eNB using NAS signalling. This corresponds to the stages 1001-1005-1007 in FIG. 10 (omitting stage 1003).
- If the UE is in RRC_IDLE, the UE will initiate the RRC connection establishment to the new eNB and indicate the VCTAU (event trigger) in the establishment cause. After the successful RRC connection establishment, the UE will send the update message to the MME with RRC signalling via the new eNB using NAS signalling.

So far we have considered VCTAU for UEs. Under the virtual cell regime, the virtual cells are also mobile so they should also engage in tracking area update reporting. If a virtual cell moves into a new eNB's coverage area, it is proposed that the VC_UE should send a RRC signalling to the new eNB with its VCTA code. The eNB is thus notified of the new VC-eNB association. Note that as long as UEs belonging to the virtual cell remain in the same VCTA, even if UEs move to new eNB with a different TA, the UEs do not need to perform a TA update. The eNB will notify the MME with an S1AP message about the new VC-eNB association. The MME will update the tracking information accordingly to maintain accurate paging of UEs.

In the disclosure thus far, a virtual cell tracking area has been defined as a mobile geographical area or region corresponding substantially to the coverage area of one virtual cell. Alternatively, one might define a virtual cell tracking area to comprise the coverage areas of two or more virtual cells within the cell of a single eNB. The choice of the size of the virtual cell tracking area depends on the required location accuracy and acceptable tracking area update message quantities. The smaller the virtual cell tracking areas, the more precise is the location information of a UE, but when the UE moves around, the more tracking area update messages it needs to send. These factors can be balanced to allow a choice of how many virtual cells may conveniently be grouped to form a virtual cell tracking area. The grouping principle could be, for example, geographical proximity, mobility status or data traffic load. As an example of a virtual cell group, consider that in an office environment it is possible to deploy several virtual cells in one room. There is no particular advantage to differentiate these virtual cells for tracking purposes. From this aspect, it is convenient to group these virtual cells and treat them as a whole. UEs moving within the virtual cell group do not need to update the virtual cell tracking area to the eNB. In an alternative example, consider virtual cells deployed by an eNB to cope with demand in a hotspot area. Several virtual cells may cover a single hotspot. All the virtual cells in this hotspot of the eNB could be grouped as a whole. It may be considered unimportant which specific virtual cell the UE camps on; knowing that the UE is in the hotspot is more important. Hence, it may be convenient to group these virtual cells as one tracking area. UEs moving within the virtual cell group don't need to update the virtual cell tracking area to eNB.

Accordingly, any references in the description or claims to a virtual cell tracking area defined as the area of a single virtual cell apply equally to a situation in which a virtual cell tracking area is defined as the area of two or more virtual cells or parts thereof. The virtual cell tracking area encompasses one virtual cell or more than one virtual cell.

The present disclosure relates to paging and tracking area update procedures in a network where virtual cells are deployed. With the proposed examples, the signalling overhead associated with paging can be reduced.

Various procedures have been described above and the skilled person will understand that the teachings provided herein, generally in the context of existing RRC procedures or of RRC-like procedures, can be equally applied to other radio control procedures, states and state transitions as appropriate.

Figure 11:
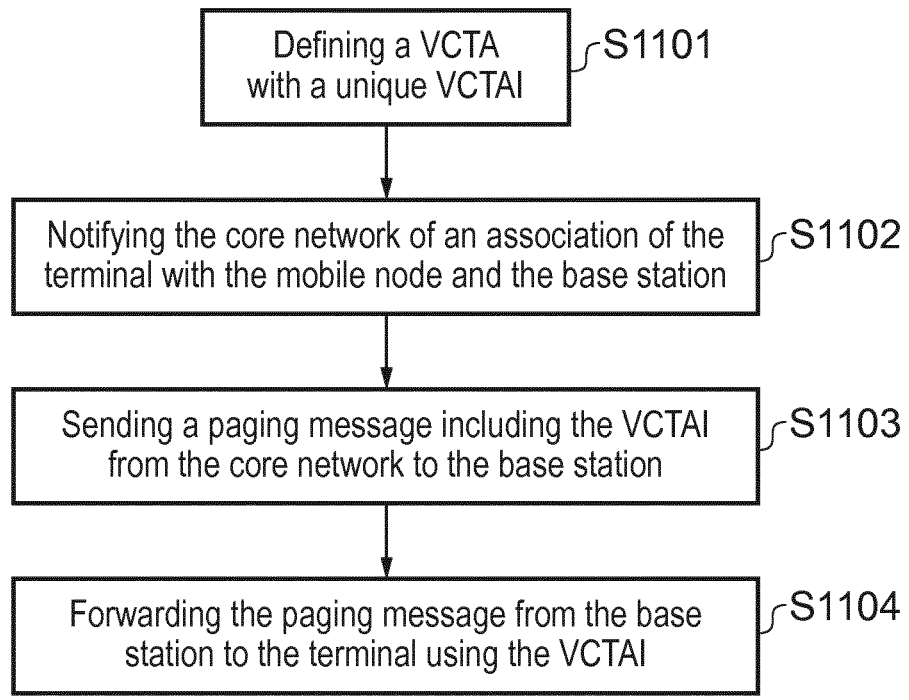
FIG. 11 shows a flow chart of steps in an example virtual cell paging method.

FIG. 11 illustrates an example method for use in a mobile telecommunications network or system. The mobile telecommunications network or system comprises a core network, a base station providing wireless connectivity within a base station cell, a mobile node operable to provide wireless connectivity within a local cell and configured to communicate with the base station, and a terminal configured to communicate wirelessly with either or both of the base station and the mobile node. The method starts, and at step S1101 a virtual cell tracking area is defined, the virtual cell tracking area encompassing the local cell and having its own unique virtual cell tracking area identifier. In step S1102, a notification is sent to notify the core network of an association of the terminal with the mobile node and the base station, in other words that the terminal is camping on the local cell. When there is a need to page the terminal, in step S1103 a paging message is sent from the core network to the base station. The association previously notified is used to direct the paging message to the base station, and the paging message includes the virtual cell tracking area identifier. In a final step S1104, the paging message is forwarded from the base station to the terminal, using the virtual cell tracking area identifier to correctly direct the paging message.

In some examples, the limited connected mode or state that can be activated by a UE to the VC-UE can be based on the RRC_IDLE or RRC_CONNECTED mode with some functionalities de-activated. For example, if based on the RRC_IDLE mode, the terminal may be configured to carry out: paging, system information acquisition and UE controlled mobility but not some other RRC functionalities including a UE specific DRX configured by upper layers, performance of neighbouring cell measurements and cell (re-)selection based on configuration information from the base station (for example the UE may not receive measurement configuration from the base station in cases where the UE already receives measurement configuration from the local/virtual cell), and performance of logging of available measurements together with location and time for logged measurement configured UEs. In the RRC_IDLE mode, the terminal is not able to communicate user data, and this remains the case in a limited state derived from the RRC_IDLE state.

In another example, if the limited connected state is based on the RRC_CONNECTED state, the following functionalities may be maintained: C-RNTI will be recorded, radio bearer between UE and eNB is retained, network controlled mobility, and acquisition of system information. On the other hand, the following functionalities may not be maintained: transfer of unicast data to/from UE, at lower layers, the UE may be configured with a UE specific DRX, the UE monitoring control channels associated with the shared data channel to determine if data is scheduled for it, the UE providing channel quality and feedback information, and the UE performing neighbouring cell measurements and measurement reporting based on configuration information from the base station.

Figure 12:
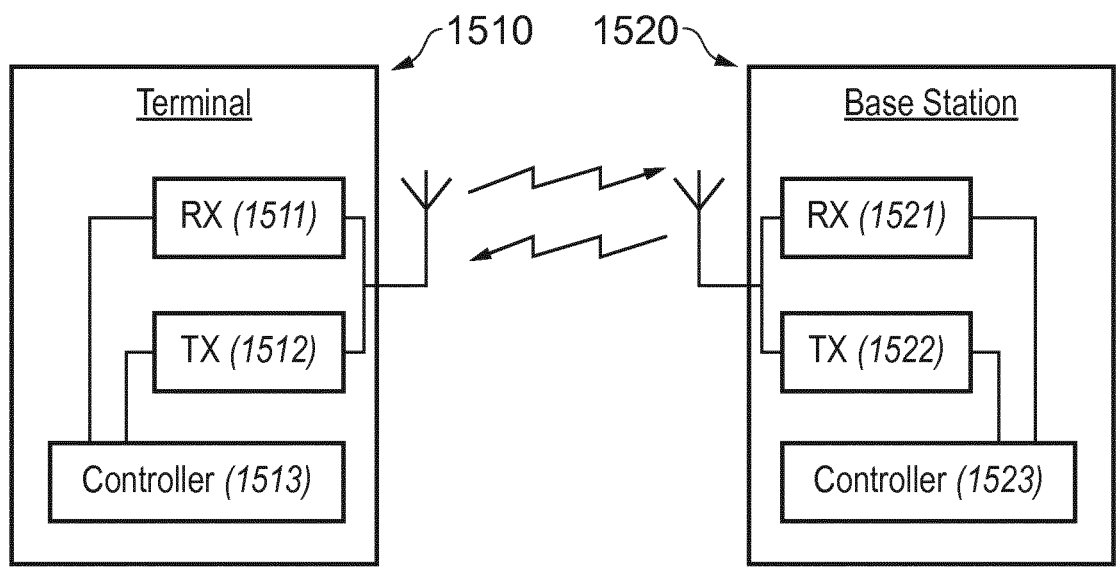
FIG. 12 shows a schematic representation of an example terminal and an example base station in a telecommunications system or network.

FIG. 12 illustrates an example terminal and an example base station configured to communicate with each other and which may implement one or more techniques as discussed herein. The terminal 1510 comprises a receiver 1511 and a transmitter 1512 connected to an antenna for communicating via a wireless interface. The terminal also comprises a controller 1513 for controlling at least the receiver and transmitter of the terminal 1510. In some examples, the terminal may be configured such that the controller, receiver and transmitter may be configured to operate together to operate as a mobile node to provide a local cell (virtual cell) to neighbouring terminals. Likewise, the base station 1520 comprises a receiver 1521 and a transmitter 1522 connected to an antenna for communicating via a wireless interface. The base station 1520 also comprises a controller 1523 for controlling at least the receiver and transmitter of the base station 1520. The base station and terminal can communicate over the air, via the wireless interface by transmitting uplink signals from the terminal to the base station and downlink signals from the base station to the terminal. A mobile node in accordance with the present disclosure may also have the same structure as the terminal and/or base station. Although it is generally expected that terminals will be providing local cell functionality, any other suitable node may provide this functionality.

While FIG. 12 shows a schematic illustration of a terminal and of a base station, it will be appreciated that while in examples of the present disclosure, each terminal includes a transmitter, receiver and controller and each base station includes a transmitter, receiver and controller so as to allow communication between the terminals and/or base stations, the terminal and base station may be implemented using any appropriate technique. For example, the controller may comprise one or more processor units which are suitably configured/programmed to provide the desired functionality described herein using conventional programming/configuration techniques for equipment in wireless telecommunications systems. For each terminal, the transmitter, receiver and controller are schematically shown in FIG. 12 as separate elements for ease of representation. However, it will be appreciated that for each terminal the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminals will in general comprise various other elements associated with their operating functionality in accordance with established wireless telecommunications techniques (e.g. a power source, possibly a user interface, and so forth).

Generally, in the present disclosure the prefix RRC has been used for states and connections with the base station and the prefix VC_RRC for states and connections with the mobile node for the local or virtual cell. However, these have been used in the interest of conciseness only, and unless they are being used specifically in the context RRC only, they are not limited to connections or states of the 3GPP (or equivalent) RRC protocol and are also intended to refer to any other radio resources control protocol.

Also, the radio resources control protocol, procedure, states or connections can also be referred to herein as radio, radio control or radio resources protocol, procedure, states or connections, respectively.

As used herein, the term mobile node is used to refer to the node providing the local/virtual cell and the mobile node functionality may be provided by a terminal, a relay node, a base station, a dedicated node, or any other suitable node.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a terminal, a mobile node, a base station or any other mobile node may be configured accordingly if appropriate, so long as it is technically feasible and not explicitly excluded.

Whenever the expressions "greater than", or "smaller than" or equivalent are used herein, it is intended that they discloses both alternatives "and equal to" and "and not equal to" unless one alternative is expressly excluded.

Note that while the present disclosure has been presented largely in the context of LTE and/or D2D, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard (e.g. the 5G standards).

Thus there has been described a method for use in a mobile telecommunications network that includes a core network, a base station providing wireless connectivity within a base station cell, a mobile node in the base station cell providing wireless connectivity within a local cell and configured to communicate wirelessly with the base station, and a terminal configured to communicate wirelessly with the base station and configured to communicate wirelessly with the mobile node; comprises defining a virtual cell tracking area that encompasses the local cell and has a unique virtual cell tracking area identifier; notifying the core network of an association of the terminal with the mobile node and the base station; sending a paging message for the terminal from the core network to the base station using the association to direct the paging message to the base station, the paging message including the virtual cell tracking area identifier; and forwarding the paging message from the base station to the terminal using the virtual cell tracking area identifier.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Clause 1. A method for use in a mobile telecommunications network, the mobile telecommunications network comprising a core network, a base station providing wireless connectivity within a base station cell, a mobile node in the base station cell providing wireless connectivity within a local cell and configured to communicate wirelessly with the base station, and a terminal configured to communicate wirelessly with the base station and configured to communicate wirelessly with the mobile node; the method comprising:

defining a virtual cell tracking area that encompasses the local cell and has a unique virtual cell tracking area identifier;

notifying the core network of an association of the terminal with the mobile node and the base station;

sending a paging message for the terminal from the core network to the base station using the association to direct the paging message to the base station, the paging message including the virtual cell tracking area identifier; and forwarding the paging message from the base station to the terminal using the virtual cell tracking area identifier.

Clause 2. The method of clause 1, in which forwarding the paging message comprises sending the paging message directly from the base station to the terminal.

Clause 3. The method of clause 1, in which forwarding the paging message comprises sending the paging message from the base station to the mobile node and sending the paging message from the mobile node to the terminal.

Clause 4. The method of any preceding clause, in which the virtual cell tracking area identifier includes a virtual cell tracking area code which uniquely identifies the virtual cell tracking area.

Clause 5. The method of clause 4, in which the virtual cell tracking area identifier comprises a mobile country code identifying the country in which the mobile telecommunications network is located; a mobile network code identifying the mobile telecommunications network; a tracking area code identifying a paging procedure tracking area in which the base station is located; and the virtual cell tracking area code.

Clause 6. The method of clause 4, in which the virtual cell tracking area identifier comprises a mobile country code identifying the country in which the mobile telecommunications network is located; a mobile network code identifying the mobile telecommunications network; and the virtual cell tracking area code.

Clause 7. The method of clause 4, 5 or 6, in which the virtual cell tracking area code comprises a mobile subscriber identification number of the mobile node.

Clause 8. The method of any preceding clause, further comprising:

establishing a full local radio connection between the terminal and the mobile node in response to the terminal receiving the paging message; and then forwarding a confirmation of successful paging from the mobile node to the core network.

Clause 9. The method of clause 8, further comprising:

starting a timer of fixed duration at the core network associated with the sending of the paging message from the core network; and if no confirmation of successful paging is received by the core network before expiry of the timer, performing a conventional paging procedure that does not incorporate the mobile node to send the paging message from the core network to the terminal.

Clause 10. The method of any preceding clause, in which the virtual cell tracking area corresponds substantially to an area of wireless connectivity coverage of the local cell.

Clause 11. The method of any preceding clause, in which the virtual cell tracking area corresponds substantially to an area of wireless connectivity coverage of the local cell plus one or more additional local cells.

Clause 12. The method of any preceding clause, further comprising, in response to a trigger, sending an updated notification of an association of the terminal with a mobile node and/or a base station.

Clause 13. The method of clause 12, in which the trigger is expiry of a fixed duration timer that runs when there is a limited local radio connection between the terminal and the mobile node.

Clause 14. The method of clause 12, in which the trigger is movement of the terminal to a different virtual cell tracking area.

Clause 15. The method of clause 12, in which the trigger is movement of the terminal to a different base station cell.

Clause 16. The method of any of clauses 12-15, comprising sending the updated notification to the base station if the terminal has moved to a different virtual cell tracking area within the base station cell.

Clause 17. The method of any of clauses 12-15, comprising sending the updated notification to the core network if the terminal has moved to a different virtual cell tracking area within a different base station cell.

Clause 18. The method of any of clauses 12-17, in which the updated notification is sent from the terminal via the mobile node.

Clause 19. The method of clause 18, comprising sending the updated notification from the mobile node to the base station or the core network comprised within a group message including updated notifications from other terminals.

Clause 20. A mobile telecommunications network, the mobile telecommunications network comprising a core network, a base station providing wireless connectivity within a base station cell, a mobile node in the base station cell providing wireless connectivity within a local cell and configured to communicate wirelessly with the base station, and a terminal configured to communicate wirelessly with the base station and configured to communicate wirelessly with the mobile node, wherein the mobile telecommunications network is configured to:

define a virtual cell tracking area that encompasses the local cell and has a unique virtual cell tracking area identifier;

notify the core network of an association of the terminal with the mobile node and the base station;

send a paging message for the terminal from the core network to the base station using the association to direct the paging message to the base station, the paging message including the virtual cell tracking area identifier; and forward the paging message from the base station to the terminal using the virtual cell tracking area identifier.

Clause 21. A mobile telecommunications network, the mobile telecommunications network comprising a core network, a base station providing wireless connectivity within a base station cell, a mobile node in the base station cell providing wireless connectivity within a local cell and configured to communicate wirelessly with the base station, and a terminal configured to communicate wirelessly with the base station and configured to communicate wirelessly with the mobile node, wherein the mobile telecommunications network is configured to carry out the method of any of clauses 1-19.

Clause 22. A method of operating a terminal for use in a mobile telecommunications network comprising a core network, a base station providing wireless connectivity within a base station cell, and a mobile node in the base station cell providing wireless connectivity within a local cell and configured to communicate wirelessly with the base station, wherein the terminal comprises a transmitter, a receiver and a controller and is configured to communicate wirelessly with the base station and to communicate wirelessly with the mobile node, the method comprising:

the terminal notifying the core network of an association of the terminal with the mobile node and the base station; and the terminal receiving from the base station a paging message sent to the base station from the core network using the association to direct the paging message to the base station, the paging message including a virtual cell tracking area identifier that uniquely identifies a virtual cell tracking area that encompasses the local cell and is used by the base station to forward the paging message to the terminal.

Clause 23. The method of clause 22, in which the terminal receives the paging message directly from the base station.

Clause 24. The method of clause 22, in which the terminal receives the paging message from the base station via the mobile node.

Clause 25. The method of any of clauses 22-24, and further comprising:

the terminal establishing a full local radio connection between the terminal and the mobile node in response to receiving the paging message, and causing the mobile node to forward a confirmation of successful paging to the core network.

Clause 26. The method of any of clauses 22-25, and further comprising:

the terminal, in response to a trigger, sending an updated notification of an association of the terminal with a mobile node and/or a base station.

Clause 27. The method of clause 26, in which the trigger is expiry of a fixed duration timer that runs when there is a limited local radio connection between the terminal and the mobile node.

Clause 28. The method of clause 26, in which the trigger is movement of the terminal to a different virtual cell tracking area.

Clause 29. The method of clause 26, in which the trigger is movement of the terminal to a different base station cell.

Clause 30. The method of any of clauses 26-29, in which the terminal sends the updated notification to the base station if the terminal has moved to a different virtual cell tracking area within the base station cell.

Clause 31. The method of any of clauses 26-29, in which the terminal sends the updated notification to the core network if the terminal has moved to a different virtual cell tracking area within a different base station cell.

Clause 32. The method of any of clauses 26-31, in which the terminal sends the updated notification via the mobile node.

Clause 33. A terminal for use in a mobile telecommunications network comprising a core network, a base station providing wireless connectivity within a base station cell, and a mobile node in the base station cell providing wireless connectivity within a local cell and configured to communicate wirelessly with the base station, wherein the terminal comprises a transmitter, a receiver and a controller and is configured to communicate wirelessly with the base station and to communicate wirelessly with the mobile node, wherein the terminal is further configured to:

notify the core network of an association of the terminal with the mobile node and the base station; and receiving from the base station a paging message sent to the base station from the core network using the association to direct the paging message to the base station, the paging message including a virtual cell tracking area identifier that uniquely identifies a virtual cell tracking area that encompasses the local cell and is used by the base station to forward the paging message to the terminal.

Clause 34. Circuitry for a terminal for use in a mobile telecommunications network comprising a core network, a base station providing wireless connectivity within a base station cell, and a mobile node in the base station cell providing wireless connectivity within a local cell and configured to communicate wirelessly with the base station; wherein the circuitry comprises a controller element and a transceiver element configured to operate together to:

enable the terminal to communicate wirelessly with the base station and with the mobile node;

notify the core network of an association of the terminal with the mobile node and the base station; and receiving from the base station a paging message sent to the base station from the core network using the association to direct the paging message to the base station, the paging message including a virtual cell tracking area identifier that uniquely identifies a virtual cell tracking area that encompasses the local cell and is used by the base station to forward the paging message to the terminal.

Clause 35. A method of operating a mobile node in a mobile telecommunications network comprising a core network, a base station providing wireless connectivity within a base station cell, the mobile node which is in the base station cell and is configured to provide wireless connectivity within a local cell and configured to communicate wirelessly with the base station, and a terminal configured to communicate wirelessly with the base station and configured to communicate wirelessly with the mobile node, the method comprising:

the mobile node receiving from the base station a paging message sent to the base station from the core network using an association of the terminal with the mobile node and the base station to direct the paging message to the base station, the paging message including a virtual cell tracking area identifier that uniquely identifies a virtual cell tracking area that encompasses the local cell and is used by the base station to forward the paging message to the mobile node; and the mobile node forwarding the paging message to the terminal.

Clause 36. The method of clause 35, and further comprising the mobile node notifying the core network of the association of the terminal with the mobile node and the base station prior to the core network sending the paging message.

Clause 37. The method of clause 35 or 36, and further comprising the mobile node activating a full local radio connection between the terminal and the mobile node in response to the terminal receiving the paging message, and then forwarding a confirmation of successful paging to the core network.

Clause 38. The method of any of clauses 35-37, and further comprising the mobile node receiving from a terminal an updated notification of an association of the terminal with the mobile node and/or a base station, and forwarding the updated notification to the base station or the core network.

Clause 39. The method of clause 38, in which the mobile node forwards the updated notification to the base station if the terminal has moved to a different virtual cell tracking area within the same base station cell.

Clause 40. The method of claim 38, in which the mobile node forwards the updated notification to the core network if the terminal has moved to a different virtual cell tracking area within a different base station cell.

Clause 41. The method of any of clauses 38-40, in which the mobile node forwards the updated notification by including it within a group message including updated notifications from a plurality of terminals, and sending the group message to the base station or the core network.

Clause 42. A mobile node for use in a mobile telecommunications network comprising a core network, a base station providing wireless connectivity within a base station cell, the mobile node and configured to provide wireless connectivity within a local cell and configured to communicate wirelessly with the base station, and a terminal configured to communicate wirelessly with the base station and configured to communication wirelessly with the mobile node, the mobile node comprising a transmitter, a receiver and a controller, and further configured to, when the mobile node is in the base station cell:

receive from the base station a paging message sent to the base station from the core network using an association of the terminal with the mobile node and the base station to direct the paging message to the base station, the paging message including a virtual cell tracking area identifier that uniquely identifies a virtual cell tracking area that encompasses the local cell and is used by the base station to forward the paging message to the mobile node; and forward the paging message to the terminal.

Clause 43. Circuitry for a mobile node for use in a mobile telecommunications network comprising a core network, a base station providing wireless connectivity within a base station cell, the mobile node, and a terminal configured to communicate wirelessly with the base station and configured to communicate wirelessly with the mobile node, the circuitry comprising a controller element and a transceiver element configured to:

operate together to provide wireless connectivity within a local cell and to communicate with the base station; and, when the mobile node is in the base station cell, receive from the base station a paging message sent to the base station from the core network using an association of the terminal with the mobile node and the base station to direct the paging message to the base station, the paging message including a virtual cell tracking area identifier that uniquely identifies a virtual cell tracking area that encompasses the local cell and is used by the base station to forward the paging message to the mobile node; and forward the paging message to the terminal.

Clause 44. A method of operating a base station in a mobile telecommunications network, the base station comprising a transmitter, a receiver and a controller and being configured to provide wireless connectivity within a base station cell, the mobile telecommunications network comprising a core network, the base station, a mobile node in the base station cell providing wireless connectivity within a local cell and configured to communicate wirelessly with the base station, and a terminal configured to communicate wirelessly with the base station and configured to communicate wirelessly with the mobile node, the method comprising the base station:

receiving from the core network a paging message sent from the core network using an association of the terminal with the mobile node and the base station to direct the paging message to the base station, the paging message including a virtual cell tracking area identifier that uniquely identifies a virtual cell tracking area that encompasses the local cell; and forward the paging message to the terminal using the virtual cell tracking area identifier.

Clause 45. The method of clause 44, comprising the base station forwarding the paging message directly to the terminal.

Clause 46. The method of clause 44, comprising the base station forwarding the paging message to the terminal via the mobile node.

Clause 47. The method of any of clauses 44-46, and further comprising the base station receiving an updated notification of an association of the terminal with a mobile node or an association of a terminal with the base station, the updated notification having been sent by the terminal in response to a trigger.

Clause 48. The method of any of clauses 44-47, and further comprising the base station receiving from the mobile node a group message including updated notifications of associations of a plurality of terminals with mobile nodes and/or base stations Clause 49. A base station for use in a mobile telecommunications network comprising a core network, the base station, a mobile node providing wireless connectivity within a local cell and configured to communicate wirelessly with the base station, and a terminal configured to communicate wirelessly with the base station and configured to communicate wirelessly with the mobile node, the base station comprising a transmitter, a receiver and a controller and being configured to:
provide wireless connectivity within a base station cell;
receive from the core network a paging message sent from the core network using an association of the terminal with the mobile node and the base station to direct the paging message to the base station, the paging message including a virtual cell tracking area identifier that uniquely identifies a virtual cell tracking area that encompasses the local cell; and
forward the paging message to the terminal using the virtual cell tracking area identifier.

Clause 50. Circuitry for a base station for use in a mobile telecommunications network comprising a core network, the base station, a mobile node providing wireless connectivity within a local cell and configured to communicate wirelessly with the base station, and a terminal configured to communicate wirelessly with the base station and configured to communicate wirelessly with the mobile node, the circuitry comprising a controller element and a transceiver element configured to:
provide wireless connectivity within a base station cell;
receive from the core network a paging message sent from the core network using an association of the terminal with the mobile node and the base station to direct the paging message to the base station, the paging message including a virtual cell tracking area identifier that uniquely identifies a virtual cell tracking area that encompasses the local cell; and
forward the paging message to the terminal using the virtual cell tracking area identifier.

Clause 51. A method of operating a core network in a mobile telecommunications network, the mobile telecommunications network comprising the core network, a base station providing wireless connectivity within a base station cell, a mobile node in the base station cell providing wireless connectivity within a local cell and configured to communicate wirelessly with the base station, and a terminal configured to communicate wirelessly with the base station and configured to communicate wirelessly with the mobile node, the core network configured to route data to and from the terminal device and the mobile node via the base station, the method comprising the core network:
receiving a notification of an association of the terminal with the mobile node and the base station; and
sending a paging message for the terminal to the base station using the association to direct the paging message to the base station, the paging message including a virtual cell tracking area identifier unique to a virtual cell tracking area that encompasses the local cell.

Clause 52. The method of clause 51, further comprising the core network receiving a confirmation of successful paging sent from the mobile node in response to establishment of a full local radio connection between the terminal and the mobile node following receipt of the paging message by the terminal from the base station or the mobile node.

Clause 53. The method of clause 52, further comprising the core network:
starting a timer of fixed duration associated with the sending of the paging message to the base station; and
if no confirmation of successful paging is received before expiry of the timer, performing a conventional paging procedure that does not incorporate the mobile node to send the paging message to the terminal.

Clause 54. The method of claim 53, further comprising the core network deleting the received notification after expiry of the timer.

Clause 55. The method of any of clauses 51-54, and further comprising the core network receiving an updated notification of an association of the terminal with a mobile node and/or a base station, the updated notification having been sent by the terminal in response to movement of the terminal to a different virtual cell tracking area within a different base station cell.

Clause 56. A core network for use in a mobile telecommunications network comprising the core network, a base station providing wireless connectivity within a base station cell, a mobile node providing wireless connectivity within a local cell and configured to communicate wirelessly with the base station, and a terminal configured to communicate wirelessly with the base station and configured to communicate wirelessly with the mobile node, the core network comprising transmitting and receiving and processing elements and configured to route data to and from the terminal device and the mobile node via the base station, the core network further configured to:
receive a notification of an association of the terminal with the mobile node and the base station; and
send a paging message for the terminal to the base station using the association to direct the paging message to the base station, the paging message including a virtual cell tracking area identifier unique to a virtual cell tracking area that encompasses the local cell.

Clause 57. Circuitry for a core network for use in a mobile telecommunications network comprising the core network, a base station providing wireless connectivity within a base station cell, a mobile node providing wireless connectivity within a local cell and configured to communicate wirelessly with the base station, and a terminal configured to communicate wirelessly with the base station and configured to communicate wirelessly with the mobile node, the circuitry comprising a processor element and a transceiver element configured to:
route data to and from the terminal device and the mobile node via the base station;
receive a notification of an association of the terminal with the mobile node and the base station; and
send a paging message for the terminal to the base station using the association to direct the paging message to the base station, the paging message including a virtual cell tracking area identifier unique to a virtual cell tracking area that encompasses the local cell.

Clause 58. Computer software which, when executed by a computer causes the computer to perform the methods of any one of clauses 1-19, 22-32, 35-41, 44-48 or 51-55.

Clause 59. A storage medium which store computer software according to clause 58.

REFERENCES

[1] Holma H. and Toskala A., "LTE for UMTS OFDMA and SC-FDMA based radio access", John Wiley and Sons, 2009

[2] TS 36.331, v12.7.0, 2015-09, Technical Specification Document for "Evolved Universal Terrestrial Radio Access (E-UTRA); Radio Resource Control (RRC); Protocol specification"

What is claimed is:

1. A method for use in a mobile telecommunications network, the mobile telecommunications network comprising a core network, a base station providing wireless connectivity within a base station cell, a mobile node in the base station cell providing wireless connectivity within a virtual cell and configured to communicate wirelessly with the base station, and a terminal configured to communicate wirelessly with the base station and configured to communicate wirelessly with the mobile node; the method comprising:

receiving at the core network an association of the terminal with the mobile node and the base station and a virtual cell tracking area identifier uniquely identifying a tracking area of the virtual cell;

sending a paging message for the terminal from the core network to the base station using the association to direct the paging message to the base station, the paging message including the virtual cell tracking area identifier; and forwarding the paging message from the base station to the terminal using the virtual cell tracking area identifier.

2. A mobile telecommunications network, the mobile telecommunications network comprising a core network, a base station providing wireless connectivity within a base station cell, a mobile node in the base station cell providing wireless connectivity within a virtual cell and configured to communicate wirelessly with the base station, and a terminal configured to communicate wirelessly with the base station and configured to communicate wirelessly with the mobile node, wherein the mobile telecommunications network is configured to:

receiving at the core network an association of the terminal with the mobile node and the base station and a virtual cell tracking area identifier uniquely identifying a tracking area of the virtual cell;

send a paging message for the terminal from the core network to the base station using the association to direct the paging message to the base station, the paging message including the virtual cell tracking area identifier; and forward the paging message from the base station to the terminal using the virtual cell tracking area identifier.

3. A method of operating a terminal for use in a mobile telecommunications network comprising a core network, a base station providing wireless connectivity within a base station cell, and a mobile node in the base station cell providing wireless connectivity within a virtual cell and configured to communicate wirelessly with the base station, wherein the terminal comprises a transmitter, a receiver and a controller and is configured to communicate wirelessly with the base station and to communicate wirelessly with the mobile node, the method comprising:

the terminal notifying the core network of an association of the terminal with the mobile node and the base station; and the terminal receiving from the base station a paging message sent to the base station from the core network using the association to direct the paging message to the base station, the paging message including a virtual cell tracking area identifier that uniquely identifies a tracking area of the virtual cell and is used by the base station to forward the paging message to the terminal.

4. The method of claim 3, in which the terminal receives the paging message directly from the base station.

5. The method of claim 3, in which the terminal receives the paging message from the base station via the mobile node.

6. The method of claim 3, and further comprising:

the terminal establishing a full local radio connection between the terminal and the mobile node in response to receiving the paging message, and causing the mobile node to forward a confirmation of successful paging to the core network.

7. The method of claim 3, and further comprising:

the terminal, in response to a trigger, sending an updated notification of an association of the terminal with a mobile node and/or a base station.

8. The method of claim 7, in which the trigger is expiry of a fixed duration timer that runs when there is a limited local radio connection between the terminal and the mobile node.

9. The method of claim 7, in which the trigger is movement of the terminal to a different virtual cell tracking area.

10. The method of claim 7, in which the trigger is movement of the terminal to a different base station cell.

11. The method of claim 7, in which the terminal sends the updated notification to the base station if the terminal has moved to a different virtual cell tracking area within the base station cell.

12. The method of claim 7, in which the terminal sends the updated notification to the core network if the terminal has moved to a different virtual cell tracking area within a different base station cell.

13. The method of claim 7, in which the terminal sends the updated notification via the mobile node.

14. Circuitry for a terminal for use in a mobile telecommunications network comprising a core network, a base station providing wireless connectivity within a base station cell, and a mobile node in the base station cell providing wireless connectivity within a virtual cell and configured to communicate wirelessly with the base station; wherein the circuitry comprises a controller element and a transceiver element configured to operate together to:

enable the terminal to communicate wirelessly with the base station and with the mobile node;

notify the core network of an association of the terminal with the mobile node and the base station; and receiving from the base station a paging message sent to the base station from the core network using the association to direct the paging message to the base station, the paging message including a virtual cell tracking area identifier that uniquely identifies a tracking area of the virtual cell and is used by the base station to forward the paging message to the terminal.

* * * * *